US011589286B2

(12) United States Patent
Liang

(10) Patent No.: US 11,589,286 B2
(45) Date of Patent: Feb. 21, 2023

(54) SYSTEMS AND METHODS FOR COMPRESSED SENSING IN WIRELESS SENSOR NETWORKS

(71) Applicant: The Trustees of Indiana University, Indianapolis, IN (US)

(72) Inventor: Yao Liang, Carmel, IN (US)

(73) Assignee: The Trustees of Indiana University, Bloomington, IN (US)

(*) Notice: Subject to any disclaimer, the term of this patent is extended or adjusted under 35 U.S.C. 154(b) by 239 days.

(21) Appl. No.: 16/869,742

(22) Filed: May 8, 2020

(65) Prior Publication Data

US 2020/0359292 A1    Nov. 12, 2020

Related U.S. Application Data

(60) Provisional application No. 62/844,915, filed on May 8, 2019.

(51) Int. Cl.
*H04W 40/02*    (2009.01)
*H04W 4/38*    (2018.01)
*H04W 84/18*    (2009.01)
*H04L 12/707*    (2013.01)
*H04L 29/08*    (2006.01)
*H04W 40/22*    (2009.01)

(52) U.S. Cl.
CPC ............. *H04W 40/02* (2013.01); *H04W 4/38* (2018.02); *H04W 84/18* (2013.01)

(58) Field of Classification Search
CPC ......... H04W 40/02; H04W 4/30; H04W 4/38; H04W 84/18; H04L 29/08306; H04L 29/08567

See application file for complete search history.

(56) References Cited

U.S. PATENT DOCUMENTS

| | | | |
|---|---|---|---|
| 10,424,048 B1* | 9/2019 | Calhoun | G06N 3/0454 |
| 2009/0326834 A1* | 12/2009 | Sundaresan | G01M 5/0066 |
| | | | 702/34 |
| 2010/0290395 A1* | 11/2010 | Sexton | H04L 67/12 |
| | | | 370/328 |

(Continued)

OTHER PUBLICATIONS

Giorgio Quer, et al. On the Interplay Between Routing and Signal Representation for Compressive Sensing In Wireless Sensor Networks; 10 pages.

(Continued)

*Primary Examiner* — Jenee Holland
(74) *Attorney, Agent, or Firm* — Faegre Drinker Biddle & Reath LLP

(57) ABSTRACT

A system and method for data acquisition in a wireless sensor network include receiving measurements made by a plurality of sensor nodes in the wireless sensor network during a given time period, the measurements being carried in data packets that are routed from the plurality of sensor nodes to a base node. The system and method also include determining a plurality of routing paths for the data packets based on routing topology tomography. The system and method further include determining a measurement matrix and a representation basis, and acquiring sensor signals in the wireless sensor network based on the measurement matrix and the representation basis.

20 Claims, 18 Drawing Sheets

(56) References Cited

U.S. PATENT DOCUMENTS

| | | | | |
|---|---|---|---|---|
| 2010/0310011 | A1* | 12/2010 | Sexton | H04L 67/12 |
| | | | | 375/316 |
| 2012/0014289 | A1* | 1/2012 | Ortega | H04W 52/04 |
| | | | | 370/255 |
| 2013/0070624 | A1* | 3/2013 | Nguyen | H04W 24/08 |
| | | | | 370/252 |
| 2019/0036801 | A1* | 1/2019 | Natarajan | H04L 67/12 |

OTHER PUBLICATIONS

Chong Luo, Jun Sun, Feng Wu, Chang Wen Chen, Compressive Data Gathering for Large-Scale Wireless Sensor Networks, MobiCom'09, Sep. 20-25, 2009; 12 pages.

David L. Donoho, Compressed Sensing, IEEE Transactions on Information Theory, vol. 52, No. 4, Apr. 2006; 18 pages.

Liu Xiang, Jun Luo, Athanasios Vasilakos, Compressed Data Aggregation for Energy Efficient Wireless Sensor Networks, IEEE 2011; 9 pages.

MD Zakirul Alam Bhuiyan, et al., Sensor Placement with Multiple Objectives for Structural Health Monitoring, ACM Transactions on Sensor Networks, vol. 10, No. 4, Article 68, Jun. 2014; 45 pages.

Miguel Navarro and Yao Liang, Efficient and Balanced Routing in Energy-Constrained Wireless Sensor Networks for Data Collection, International Conference on Embedded Wireless Systems and Networks 2016; 12 pages.

Hosein Mohimani, Massoud Babaie-Zadeh, Christian Jutten, A Fast Approach for Overcomplete Sparse Decomposition Based on Smoothed e0 Norm, IEEE Transactions on Signal Processing, vol. 57, No. 1, Jan. 2009; 13 pages.

TinyOS Documentation Wiki; 4 pages.

Emmanuel J. Candes, Justin Romberg, Terence Tao, Robust Uncertainty Principles: Exact Signal Reconstruction From Highly Incomplete Frequency Information, IEEE Transactions on Information Theory, vol. 52, No. 2, Feb. 2006; 21 pages.

Sparselab, Seeking Sparse Solutions to Linear Systems of Equations; 1 page.

Wei Wang, Minos Garofalakis, Kannan Ramchandran, Distributed Sparse Random Projections for Refinable Approximation, IPSN'07, Apr. 25-27, 2007; 9 pages.

Cover more space, metergroup.com/environment/products/ec-5-soil-moisture-sensor; 5 pages.

MEMSIC Systems, MEMSIC Powerful Sensing Solutions; 1 page.

Jarvis Haupt, Compressed Sensing for Networked Data, IEEE Signal Processing Magazine, Mar. 2008; 10 pages.

Miguel Navarro, Diviyansh Bhatnagar, Yao Liang, An Integrated Network and Data Management System for Heterogeneous WSNs, 2011 Eighth IEEE International Conference on Mobile Ad-Hoc and Sensor Systems; 6 pages.

Newlyn Erratt and Yao Liang, The Design and Implementation of A General WSN Gateway for Data Collection, 2013 IEEE Wireless Communications and Networking Conference (WCNC): Services & Applications; 6 pages.

Tyler W. Davis, Xu Liang, Miguel Navarro, Diviyansh Bhatnagar, Yao Liang, An Experience Study of WSN Power Efficiency MICAz Networks with XMesh, Hindawi Publishing Corporation, International Journal of Distributed Sensor Networks, vol. 2012, Article ID 358238; 14 pages.

Omprakash Gnawali, et al., CTP: An Efficient, Robust, and Reliable Collection Tree Protocol for Wireless Sensor Networks, ACM Transactions on Sensor Networks, vol. 10, No. 1, Article 16, Nov. 2013; 49 pages.

Miguel Navarro, et al., A Study of Long-Term WSN Deployment for Environmental Monitoring, 2013 IEEE 24th International Symposium on Personal, Indoor and Mobile Radio Communications: Mobile and Wireless Networks; 5 pages.

MICAz Wireless Measurement System; 7 pages.

IRIS Wireless Measurement System; 2 pages.

Miguel Navarro, et al., Towards Long-Term Multi-Hop WSN Deployments for Environmental Monitoring: An Experimental Network Evaluation, J. Sens. Actuator Netw. 2014, 4, 297-330; 34 pages.

German Villalba, et al., A Networked Sensor System for the Analysis of Plot-Scale Hydrology, Sensors 2017, 17, 636; 27 pages.

Yi Gao, Wei Dong, Chun Chen, Jiajun Bu, Wenbin Wu, Xue Liu, iPath: Path Inference in Wireless Sensor Networks, IEEE/ACM Transactions on Networking, vol. 24, No. 1, Feb. 2016; 6 pages.

Stephane G. Mallat, A Theory for Multiresolution Signal Decomposition: The Wavelet Representation, IEEE Transactions on Pattern Analysis and Machine Intelligence, vol. 11, No. 7, Jul. 1989; 20 pages.

Ronan Hamon, et al., Discovering the structure of complex networks by minimizing cyclic bandwidth sum, Feb. 2015; 38 pages.

Raif M. Rustamov, Leonidas Guibas, Wavelets on Graphs via Deep Learning; 9 pages.

Mohammad Hamed Firooz, Sumit Roy, Link Delay Estimation via Expander Graphs, IEEE Transactions on Communications, vol. 62, No. 1, Jan. 2014; 12 pages.

Zhidan Liu, Zhengjiang Li, Mo Li, Wei Xing, Dongming Lu, Path Reconstruction in Dynamic Wireless Sensor Networks Using Compressive Sensing, IEEE/ACM Transactions on Networking, vol. 24, No. 4, Aug. 2016; 13 pages.

Yunhao Liu, et al., Does Wireless Sensor Network Scale? A Measurement Study on GreenOrbs, IEEE Transactions on Parallel and Distributed Systems, vol. 24, No. 10, Oct. 2013; 11 pages.

Rui Liu, Yao Liang, Xiaoyang Zhong, Monitoring Routing Topology in Dynamic Wireless Sensor Network Systems, 2015 IEEE 23rd International Conference on Network Protocols; 11 pages.

Xiaopei Lu, Dezun Dong, Xiangke Liao, Shanshan Li, PathZip: Packet Path Tracing in Wireless Sensor Networks, IEEE 2012; 9 pages.

Yi Gao, et al., Pathfinder: Robust Path Reconstruction in Large Scale Sensor Networks with Lossy Links, IEEE 2013; 7 pages.

Kao Liang, Rui Liu, Routing Topology Inference for Wireless Sensor Networks, ACM SIGCOMM Computer Communication Review, vol. 43, No. 2, Apr. 2013; 7 pages.

Liu Xiang, Jun Luo, Catherine Rosenberg, Compressed Data Aggregation: Energy-Efficient and High-Fidelity Data Collection, IEEE/ACM Transactions on Networking, vol. 21, No. 6, Dec. 2013; 14 pages.

Xufei Mao, Xin Miao, Yuan He, Xiang-Yang Li, Yunhao Liu, CitySee: Urban CO2 Monitoring with Sensors, 2012 Proceedings IEEE INFOCOM; 9 pages.

Xiaopei Wu, Mingyan Liu, In-situ Soil Moisture Sensing: Measurement Scheduling and Estimation using Compressive Sensing, IPSN'12; 11 pages.

Haifeng Zheng, et al., Data Gathering with Compressive Sensing in Wireless Sensor Networks: A Random Walk Based Approach, IEEE Transactions on Parallel and Distributed Systems, vol. 26, No. 1, Jan. 2015; 10 pages.

Linghe Kong, et al., Data Loss and Reconstruction in Sensor Networks, 2013 Proceedings IEEE INFOCOM; 9 pages.

Xiao-Yang Liu, et al., CDC: Compressive Data Collection for Wireless Sensor Networks, IEEE Transactions on Parallel and Distributed Systems, vol. 26, No. 8, Aug. 2015; 10 pages.

* cited by examiner

SYSTEMS AND METHODS FOR COMPRESSED SENSING IN WIRELESS SENSOR NETWORKS

CROSS-REFERENCE TO RELATED APPLICATIONS

This application claims priority to U.S. Provisional Patent Application No. 62/844,915, filed May 8, 2019, and entitled "COMPRESSED SENSING IN MULTI-HOP LARGE-SCALE WIRELESS SENSOR NETWORKS BASED ON ROUTING TOPOLOGY TOMOGRAPHY," the entire disclosure of which is expressly incorporated by reference herein.

STATEMENT OF GOVERNMENT SUPPORT

This invention was made with government support under NSF1320132 awarded by National Science Foundation. The government has certain rights in the invention.

FIELD OF THE DISCLOSURE

The present disclosure relates generally to wireless sensor networks, and more particularly, to systems and methods for compressed sensing in wireless sensor networks based on routing topology tomography.

BACKGROUND OF THE DISCLOSURE

Wireless sensor networks (WSNs), comprised of spatially distributed sensor nodes, are being increasingly deployed for continuous monitoring and sensing of physical variables of our world. One of the critical challenges in large-scale outdoor WSN deployments is energy consumption, since outdoor sensor nodes are mainly operated by battery power. Motivated by the breakthrough of compressed sensing (CS), CS based approaches for WSN data collection have gained increasing attention from the research communities. However, existing CS methods for WSNs are facing the following major difficulties in practice: (i) how to effectively and efficiently interplay with WSN routing so that per-packet routing path can be exploited as a random projection in CS measurement matrix to further reduce nodes' transmissions, and (ii) how to design a suitable representation basis in CS for real-world signals that has good sparsification and incoherence with the measurement matrix for applying CS to large-scale WSN data acquisition.

As such, finding a suitable transformation with good sparsification and incoherence properties remains an open problem. Furthermore, existing CS approaches for multi-hop WSN data acquisition are only evaluated by numerical simulations with the assumptions of some routing models. While useful, numerical simulations alone are not adequate. The lack of validation in multi-hop WSN deployments in situ operated in real-world dynamic communication environments hinders any deep understanding of CS approaches for large-scale WSN data collection and their meaningful comparison. Therefore, the need of practical validation and evaluation of CS approaches in real WSNs in situ is also urgent.

In the recent years, many research efforts have been pursued to incorporate CS into data collection schemes in WSNs. Traditional CS based approaches do not exploit the knowledge about WSN routing topology but rely on the use of dense measurement matrices, resulting in high transmission costs and storing a part of measurement matrix in each resource-constrained sensor node.

One recent study focused on sparse random projections for WSN data querying without interaction with routing. While this approach could reduce WSN transmission costs for data nodes compared to the CS approaches based on dense measurement matrices, it does not solve the problem of storing a part of the measurement matrix at each sensor node, and its performance would also be largely diminished in multi-hop WSNs. Another study focused on the interplay of routing with compressive sensing in multi-hop WSNs, where the measurement matrix is defined according to the routing paths. However, the results of this study were unsatisfactory due to the difficulty to find a suitable representation basis for real signals.

Some theoretical analysis has been presented regarding the nonuniform random projection of CS. However, it is not clear if this study is applicable to the situation where the nonuniform random projection of CS projection is formed from practical WSN routing. Besides, each per-packet routing path is recorded in the data packet routed towards the sink, which is neither scalable nor efficient. For example, if a node identifier is two bytes (e.g., as in TinyOS), then for a WSN of the maximum path of J hops to the sink it would have to allocate 2(J-1) bytes in a data packet for its path recording overhead. This heavy overhead of path recording also increases energy and band-width consumptions for transmissions, reducing or eliminating the performance of data compression. Another study proposes a random walk algorithm for data gathering in multi-hop WSNs, where the measurements are collected along the random walks before they are sent to the sink using shortest path routing. Therefore, this approach does not interplay with WSN routing. Since it requires the length of each walk t=O(n/k) for each packet before routing to the sink, the approach increases the WSN energy consumption because of the additional random walk transmissions. A further study to compute projections is based on analog communications, where CS projections are simultaneously calculated by the superposition of radio waves and communicated directly from the sensor nodes to the sink via the air interface. This approach, however, requires analog communications for WSNs, which is in contrast to today's digital communications commonly used in WSN physical layer, such as IEEE 802.15.4 communication protocol. Still another study involves network link delay estimation by using CS via expander graphs when the routing matrix is predetermined. This approach demonstrated the feasibility of accurate estimation with bounded errors. Other studies have focused on temporal correlations in a sequence of samples taken by each sensor node in WSN. However, no work has been performed so far to validate CS performance in multi-hop WSNs through real experiments on WSN deployments in situ with actual routing protocol in operation.

SUMMARY OF THE DISCLOSURE

According to some embodiments, the present disclosure provides a method for data acquisition in wireless sensor networks. The method includes receiving measurements made by a plurality of sensor nodes in a wireless sensor network during a given time period. The measurements are aggregated and carried in data packets that are routed from the plurality of sensor nodes to a base node in the wireless sensor network. The method also includes determining a plurality of routing paths for the data packets based on routing topology tomography, where the plurality of routing paths represent paths traversed by the data packets in the wireless sensor network to reach the base node. Further, the method includes determining a measurement matrix from the plurality of routing paths and a representation basis for sensor signals in the wireless sensor network. Moreover, the method includes acquiring the sensor signals in the wireless sensor network based on the measurement matrix and the representation basis.

According to certain embodiments, the present disclosure provides a system for data acquisition in wireless sensor networks. The system includes a wireless sensor network having a plurality of sensor nodes and a base node, and a computing device coupled to the wireless sensor network. The computing device includes a processor and a memory. The memory includes instructions that, when executed by the processor, cause the processor to receive measurements made by the plurality of sensor nodes during a given time period. The measurements are aggregated and carried in data packets that are routed from the plurality of sensor nodes to the base node. The processor also determines a plurality of routing paths for the data packets based on routing topology tomography, where the plurality of routing paths represent paths traversed by the data packets in the wireless sensor network to reach the base node. Further, the processor determines a measurement matrix from the plurality of routing paths and a representation basis for sensor signals in the wireless sensor network. Moreover, the processor acquires the sensor signals in the wireless sensor network based on the measurement matrix and the representation basis.

According to some embodiments, the present disclosure presents a non-transitory computer readable storage medium having instructions for data acquisition in wireless sensor networks. The instructions, when executed by a processor, cause the processor to receive measurements made by a plurality of sensor nodes in a wireless sensor network during a given time period. The measurements are aggregated and carried in data packets that are routed from the plurality of sensor nodes to a base node in the wireless sensor network. The instructions also cause the processor to determine a plurality of routing paths for the data packets based on routing topology tomography, where the plurality of routing paths represent paths traversed by the data packets in the wireless sensor network to reach the base node. Further, the instructions cause the processor to determine a measurement matrix from the plurality of routing paths and a representation basis for sensor signals in the wireless sensor network. Moreover, the instructions cause the processor to acquire the sensor signals in the wireless sensor network based on the measurement matrix and the representation basis.

In some examples, determining the measurement matrix further includes calculating a routing matrix based on the plurality of routing paths and adopting the routing matrix as the measurement matrix. In certain examples, each of the plurality of routing paths is defined in terms of a plurality of intermediate nodes traversed by a respective data packet in reaching the base node, where the measurements carried in the respective data packet are aggregated at each of the plurality of intermediate nodes. In some examples, determining the plurality of routing paths is based on routing protocol tomography along the plurality of routing paths. In certain examples, determining the representation basis further includes determining an underlying graph based on the plurality of routing paths, performing a hierarchy decomposition of the underlying graph, applying machine learning to the hierarchy decomposition of the underlying graph to construct graph wavelets, and determining the representation basis based on the graph wavelets. The representation basis is a sparse matrix having an optimized incoherency with the measurement matrix.

DETAILED DESCRIPTION OF THE DISCLOSURE

The embodiments disclosed herein are not intended to be exhaustive or to limit the disclosure to the precise form disclosed in the following detailed description. Rather, these embodiments were chosen and described so that others skilled in the art may utilize their teachings.

Data acquisition from multi-hop large-scale outdoor WSN deployments for environmental monitoring is full of challenges. This is because of the severe resource constraints on tiny battery-operated motes (e.g., bandwidth, memory, power, and computing capacity), the data acquisition volume from large-scale WSNs, and the highly dynamic wireless link conditions in outdoor harsh communication environments. The present disclosure describes a CS technique, which can recover the sensing data at the sink with high fidelity when very few data packets need to be collected. This leads to a significant reduction of the network transmissions and thus an extension of the WSN lifetime. Interplaying with the dynamic WSN routing topology, the CS technique of the present disclosure is both efficient and simple to implement on the resource-constrained motes without motes' storing of any part of the random projection matrix. The present disclosure further proposes a systematic method via machine learning to find a suitable representation basis, for any given WSN deployment and data field, which is both sparse and incoherent with the random projection matrix in compressed sensing for data collection. The CS technique of the present disclosure is validated by evaluating its performance using a real-world outdoor multi-hop WSN testbed deployment in situ. The results demonstrate that the CS technique of the present disclosure significantly outperforms existing CS approaches by reducing data recovery errors by an order of magnitude for the entire WSN observation field while drastically reducing wireless communication costs at the same time.

The present disclosure addresses challenges in the emerging Internet of Things and attempts to fill the gap. The present disclosure provides a practical and efficient CS solution for large-scale real-world WSN data acquisition and focuses on the joint compression and routing in outdoor multi-hop WSNs in situ where the communication environment is highly dynamic and harsh. Specifically, the CS technique of the present disclosure is employed for multi-hop large-scale dynamic WSNs in situ for data acquisition based on network routing topology tomography. In addition, a systematic method, based on graph wavelets via deep learning, is developed to find an optimized representation basis which is extremely sparse and also incoherent with the measurement matrix. The CS technique in the present disclosure is evaluated in an environmental multi-hop WSN deployment in a watershed, operating with TinyOS and an extended Collection Tree Protocol (CTP) with energy efficient and balance routing.

Figure 1:
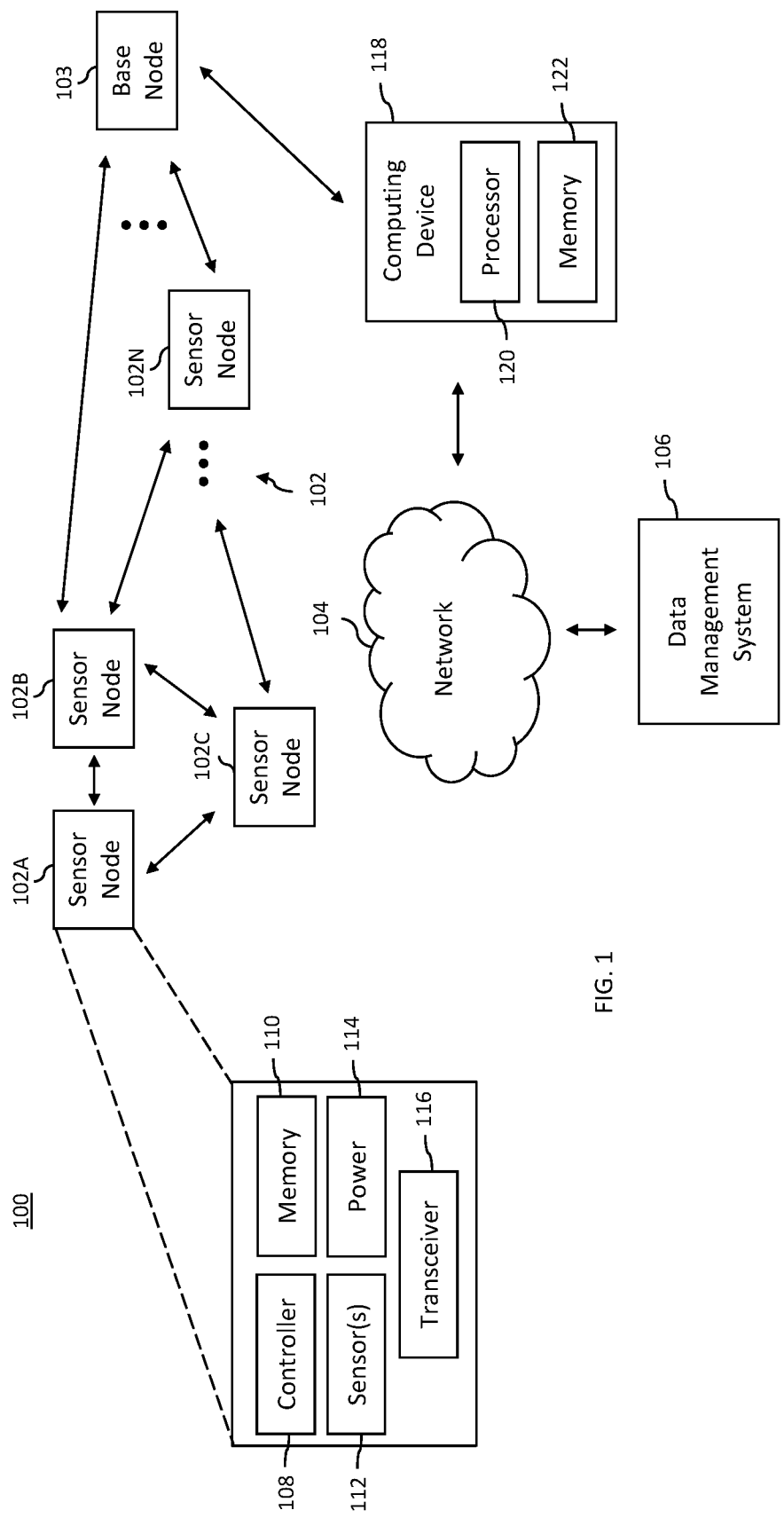
FIG. 1 is a block diagram illustrating a system for data acquisition in WSNs.

FIG. 1 illustrates a system 100 for data acquisition in WSNs. The system 100 includes a WSN 102, a communication network 104 (e.g., a local area network (LAN), a wide area network (WAN), a personal area network (PAN), the Internet, etc.), and a data management system 106 (e.g., a database). The WSN 102 includes a plurality of sensor nodes 102A-102N and a base node 103 (e.g., sink). The plurality of sensor nodes 102A-102N are spatially distributed to monitor various physical and/or environmental conditions such as temperature, sound, pressure, humidity, etc. Sensory information gathered by the plurality sensor nodes 102A-102N are forwarded to the base node 103 (e.g., via radio frequency, optical communication, infrared, etc.) for collection. In various embodiments, the sensory information gathered by the plurality of sensor nodes 102A-102N are carried in data packets routed to the base node 103 using a suitable routing protocol (e.g., CTP, XMesh). In general, the topology of the WSN 102 can be any form ranging from a simple star network to an advanced multi-hop mesh network.

Each of the plurality of sensor nodes 102A-102N, also known as a mote, includes a controller 108 (e.g., a microprocessor, a microcontroller, a digital signal processor, an application-specific integrated circuit (ASIC)), a memory 110 (e.g., flash memory), one or more sensors 112 (e.g., temperature sensor, humidity sensor, etc.), a power source 114 (e.g., a battery), and a transceiver 116 (e.g., radio unit, antenna). The base node 103 has similar components as a sensor node but may be connected to a permanent power supply. In some embodiments, the base node 103 has more memory capacity than a sensor node. In certain embodiments, each of the plurality of sensor nodes 102A-102N is a MICAz mote and the base node 103 is an IRIS mote.

According to various embodiments, the base node 103 is communicatively coupled to a computing device 118 (e.g., a desktop, a laptop, etc.) that includes a processor 120 (e.g., central processing unit (CPU)) and a memory 122 (e.g., random-access memory (RAM), read-only memory (ROM)). Sensed data collected at the base node 103 from the plurality of sensor nodes 102A-102N are sent to the computing device 118 for processing, analysis, and/or storage. In some embodiments, the computing device 118 is operated as a WSN gateway. As such, the computing device 118 forwards any or all sensed data to the data management system 106 for processing, analysis, and/or storage via the communication network 104.

CS is a breakthrough technique in signal processing. CS theory asserts that for sparse or compressible signals, CS can be employed to recover the original signals by using far fewer measurements or samples than required by the Nyquist rate. Consider an N-dimensional discrete sparse signal vector $x \in \mathbb{R}^N$, which is referred to as k-sparse if x has no more than k(k<<N) nonzero items. Mathematically, CS theory has shown that if x is sparse, under certain conditions, then it is possible to reconstruct the signal vector x from M measurements $y=[y^1, y^2 \ldots y^M]^T$ with a quasi-random M×N measurement matrix $\Phi$, e.g., $y=\Phi x$, where M(k<M) is much smaller than N. This can be achieved (with probability close to one) by solving the following optimization:

$$\min_x \|x\|_p \; s.t. \; y=\Phi x, \tag{1}$$

where $\|x\|_p (p=0, 1)$ denotes $l_p$-norm of x. Often, a signal x is not sparse but can be sparsely represented in an alternative domain.

Specifically, if x can be further written as $x=\Psi s$, for some N×N matrix $\Psi$, where s is the N× 1 coefficient vector in the $\Psi$-domain with $\|s\|_0=k$, the matrix $\Psi$ will be referred to as the representation basis. With $y=\Phi\Psi s=\tilde{\Phi}s$, where $\tilde{\Phi}=\Phi\Psi$ is also quasi-random. Then the associated signal recovery problem is to determine s for given measurements y and the defined matrices $\Phi$ and $\Psi$:

$$\min_s \|s\|_p \; s.t. \; y=\tilde{\Phi}s. \tag{2}$$

As M is much smaller than N, this is an under-determined linear system. The reconstruction of the original signal x is given by $x=\Psi s$.

To minimize the number of transmissions, the CS technique of the present disclosure, also referred to as CSR (compressed sensing based on dynamic routing topology tomography), closely interplays with the dynamic routing topology in a given WSN deployment. As a data packet is routed from its source node towards the sink, the sensor reading of each traversed node adds up along the path.

Figure 2B:
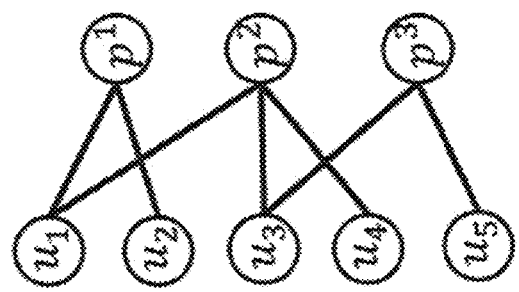
FIGS. 2A-2B are conceptual diagrams illustrating a sensor network upward routing topology for data collection.
Figure 2A:
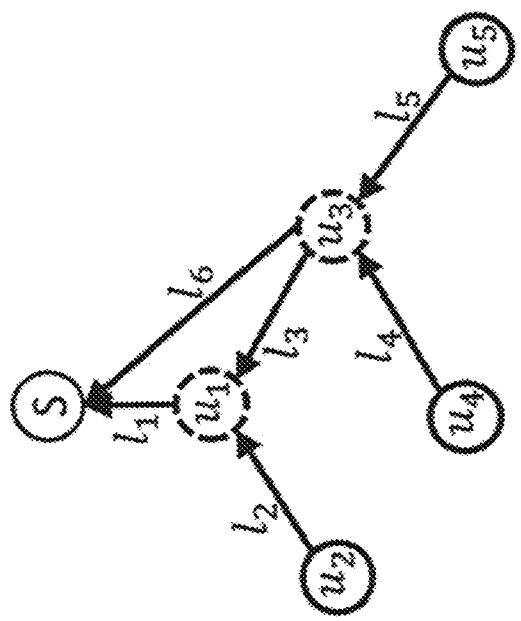

Let a dynamic WSN for data collection be modeled as a directed acyclic graph G(V, E), where V is a set of n nodes (i.e., the sink S and n−1 sensor nodes), and E is a set of edges. A directed edge e(u, v), an ordered pair (u, v)∈V× V, represents the wireless communication link from node u to node v. Let $p^i=[u_0, u_1, \ldots, u_j, \ldots, S]$ denote a routing path of packet i from a source node $u_0$ to the sink S, which is a sequence of all nodes traversed along the route. For example, as shown in FIGS. 2A-2B, there are three data collection paths initiated from leaf nodes in a collection cycle: $p^1=[u_2, u_1, S]$, $p^2=[u_4, u_3, u_1, S]$, and $p^3=[u_5, u_3, S]$. In FIG. 2A, the solid circles (e.g., $u_2$, $u_4$, $u_5$, S) represent boundary nodes while the dash circles (e.g., $u_1$, $u_3$) represent intermediate nodes.

Let (denote the routing matrix corresponding to the set of paths $P_\Phi=\{p^1, p^2, p^3\}$. Then, for the sensor network shown in FIG. 2A, the routing matrix Φ for the given data collection cycle is as follows:

$$\Phi = \begin{matrix} p^1: u_2 \to S \\ p^2: u_4 \to S \\ p^3: u_5 \to S \end{matrix} \begin{matrix} u_1 & u_2 & u_3 & u_4 & u_5 \\ \begin{bmatrix} 1 & 1 & 0 & 0 & 0 \\ 1 & 0 & 1 & 1 & 0 \\ 0 & 0 & 1 & 0 & 1 \end{bmatrix} \end{matrix} \quad (3)$$

A bipartite graph B(V, $P_\Phi$, H) can be formed from a G(V, E) with a bi-adjacency matrix Φ, where V is the set of nodes in G(V, E), and H ⊂ V× $P_\Phi$ is a set of coupled elements from V to $P_\Phi$. FIG. 2B represents the bipartite graph for the WSN in FIG. 2A with the routing matrix Φ.

According to some embodiments, let $y_j^i$, carried by packet i, denote the aggregated compressed sensor reading measurement at node $u_j$ along the route $p^i$ towards the sink. The in-network compressing operation for each data packet i is defined as:

$$y_0^i = \text{reading}(u_0), j=0, \quad (4)$$

$$y_j^i = y_{j-1}^i + \text{reading}(u_j), j>0, \quad (5)$$

where $y_j^i$ is computed on the fly at each intermediate node j along the dynamic route $p^i$ towards the sink.

In certain embodiments, M(M<<n−1) data packets initiated from M randomly selected source nodes of the WSN are collected in each data collection cycle, which carry M compressed sensing measurements specified by Equations (4) and (5), along their respective routing paths, where the M compressed sensing measurements received by the sink S in each collection cycle are denoted by $y=[y^1, y^2, \ldots, y^M]^T$. As can be seen, each data collection routing path represents a random projection of the WSN data field. In general, a routing path in an outdoor WSN is inherently random due to the highly dynamic wireless link conditions of the WSN. In addition, some WSN routing protocols (e.g., CTP+EER, an extended CTP) could further induce more randomness in routing paths.

A critical issue of such a CS formed via WSN routing is how to obtain such dynamic routing path information at the sink. Since realistic WSN deployments in situ under time-varying communication environments (e.g., where wireless links available a moment ago for a previous packet transmission may not be available for the current packet in a random way) were considered, such on-the-fly routing information cannot be obtained in advance. The CS technique of the present disclosure does not record the entire original routing path of a data packet piggy back as the packet traverse along its path towards the sink. Instead, the CS technique of the present disclosure uses WSN routing topology tomography to obtain the dynamic routing information needed for the interplay between the compressed sensing and routing.

Because the overhead of routing tomography techniques is usually very small per packet compared with the recording of the raw path trace, the energy efficiency of WSN compressed data collection can be further improved by significantly reducing the overhead of path recording carried in each packet. For example, the Routing Topology Recovery (RTR) method only has a fixed four-byte overhead of path measurement per each packet independent of the actual path length of the packet. More importantly, the small fixed size of path measurement overhead means that it is scalable for large-scale WSN deployments with very long paths, as the widely used IEEE 802.15.4 communication protocol in WSNs has only the maximum size of 127-byte MAC frame including the header.

Figure 3:
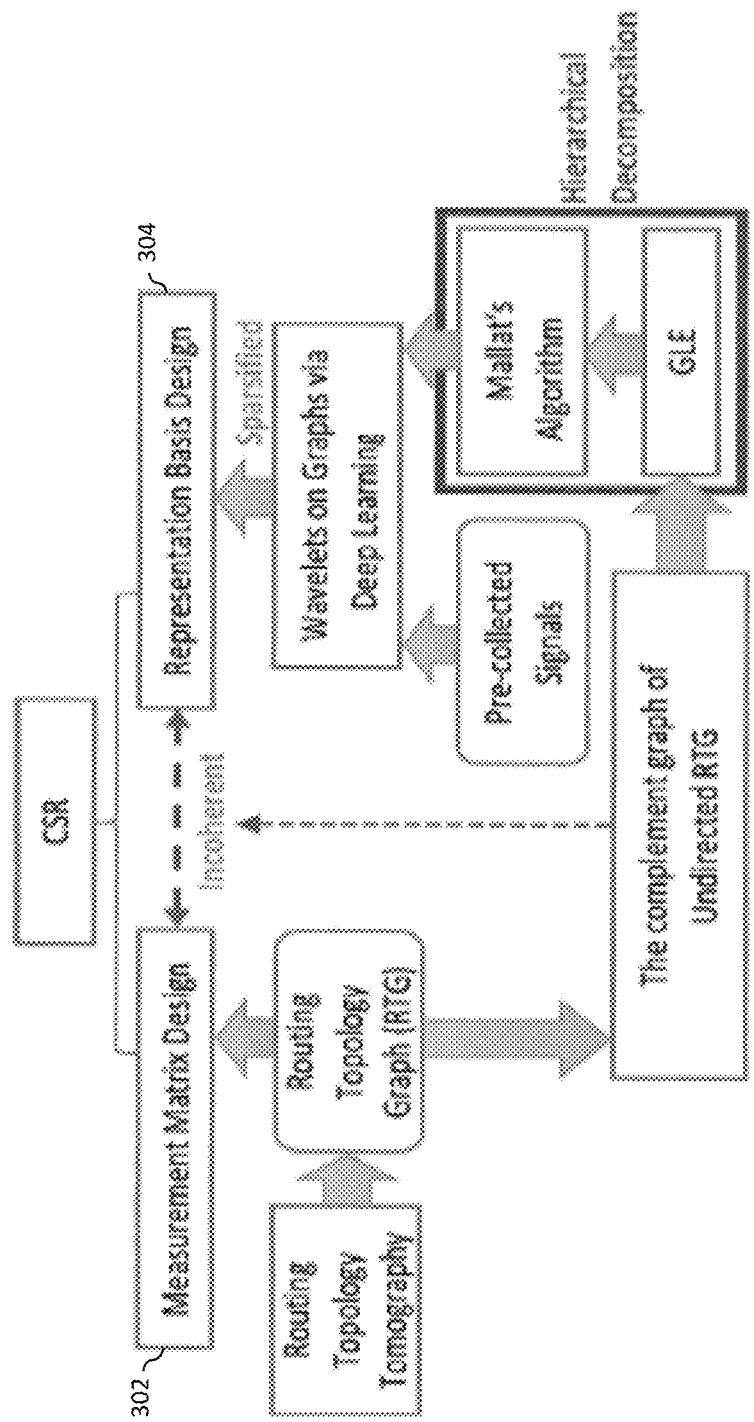
FIG. 3 is a conceptual diagram illustrating a CS technique.

FIG. 3 illustrates a conceptual diagram for the CS technique of the present disclosure also referred to as CSR. As shown in FIG. 2, two fundamental components of CSR include a random measurement (e.g., projection) matrix 302 and a representation basis 304. The measurement matrix 302 is constructed based on the routing topology tomography. The representation basis 304 is constructed based on graph wavelets via deep machine learning. To achieve this, an algorithm is developed, referred to as Graph Linear Embedding (GLE), to enable the partitioning of the multiscale structure imposed on the underlying irregular graph, where the use of the complement graph of the undirected routing topology graph is proposed to satisfy the incoherence between the measurement matrix 302 and the representation basis 304.

According to some embodiments, the M×N(N=n−1) measurement matrix $\Phi=\varphi_{i,j}(1\leq i\leq M, 1\leq j\leq N)$ is constructed using the dynamic WSN routing matrix, leveraged by emerging WSN routing tomography. After M data packets are received in a WSN data collection cycle, the routing paths for those M packets are first reconstructed via an adopted routing topology reconstruction algorithm (e.g., RTR). If node j is t(t≥1) times on the path of packet i received at the sink, then $\varphi_{i,j}=t$; otherwise, $\varphi_{i,j}=0$. The i-th row of the measurement matrix Φ represents the routing path of packet i received at the sink in the given cycle, as illustrated in Equation (3). By allowing $\varphi_{i,j}>1$, any loopy path of the received packets can be handled.

Let G(V, E) be a WSN with an upward routing matrix Φ for a given data collection cycle. Suppose that B(V, $P_\Phi$, H) is a bipartite graph with bi-adjacency matrix Φ. It is feasible to use routing matrix as measurement matrix in CS in recovering k-sparse sensor signals in the given data collection cycle, while the expected estimation error is bounded.

The problem here is an isomorphism problem of the network link delay estimation via CS. First, the sink and the leaf nodes are boundary nodes, while the others are intermediate nodes. Thus, an upward routing path from a leaf node to a/the sink in the sensor network is equivalent to an end-to-end path in the network. Second, the routing matrix Φ (e.g., measurement matrix) is defined in terms of the traversed nodes in each path in the network rather than the traversed links in each path. Consequently, the formation of bipartite graph B(V, $P_\Phi$, H) is based on the network node set V as opposed to the bipartite graph G(E, R, H) based on the network link set E. All the theorems on the derivation of the error bounds would still be held when the bipartite graph G(E, R, H) is replaced by B(V, $P_\Phi$, H). Thus, the sensor signals on the nodes can be feasibly recovered using LP as the delays on the links. Note that due to various random noises and interferences in outdoor WSN in situ, the constructed measurement matrix Φ for a different data collection cycle would be quite different due to wireless link dynamics, even if the deployed routing protocol does not induce any additional random effect on the routing topology.

As can be seen, interplaying with WSN dynamic routing on the fly, each sensor node neither stores the matching column in the measurement matrix, nor performs vector multiplication and vector addition. As sensor nodes of outdoor WSNs are usually battery-powered with very limited memory and low-cost microcontroller, the CS technique of the present disclosure is able to effectively interplay with routing is particularly feasible and suitable for multi-hop and dynamic WSN deployments in situ.

According to certain embodiments, there are two main criteria in selecting a good representation basis Ψ in CS: (i) its corresponding inverse has to sufficiently sparsify the signal x; and (ii) it has to be sufficiently incoherent with the measurement matrix Φ. A long-standing open question of CS for WSN data collection in conjunction with routing is how to find an appropriate representation basis Ψ with good sparsification and incoherence properties. To address this problem, a suitable Ψ was built based on graph wavelets via deep machine learning, since the sensor data collected from a WSN are signals defined on the graph of the WSN deployment topology. A recently developed machine learning framework, referred herein as GDL, is used for constructing graph wavelets which is expected to sparsely represent a given class of signals on irregular graphs. The basic idea is to use the lifting scheme as applied to the Haar wavelets. The recurrent nature of the lifting scheme gives rise to a structure resembling a deep auto-encoder network. One unique advantage of GDL is the constructed wavelets are adaptive to a class of signals on the underlying irregular graph, which can better explore the inherent multiresolution structure of a given class of signals on the underlying graph.

For any signal f on the graph G and any level $l_0 < l_{max}$ the wavelet decomposition can be expressed as:

$$f = \Sigma_i a_{l_0,i} \phi_{l_0,i} + \Sigma_{l=l_0}^{l_{max}-1} \Sigma_i d_{l,i} \psi_{l,i} \qquad (6)$$

Figure 4:
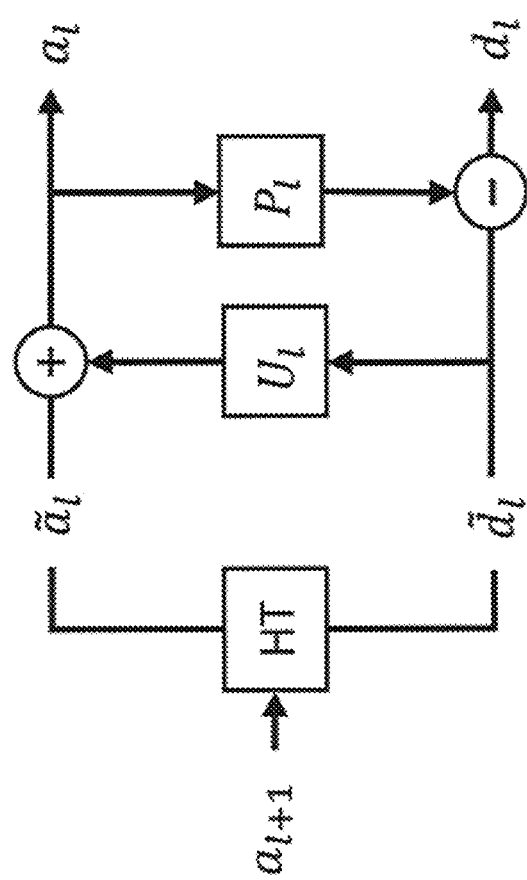
FIG. 4 is a conceptual diagram illustrating wavelet construction based on a lifting scheme.

The coefficients $a_{l,i}$ and $d_{l,i}$ are called approximation and detail (e.g., wavelet) coefficients, respectively. In GDL, the construction of the wavelets is based on the lifting scheme as illustrated in FIG. 4. Starting with an Haar transform (HT), and $l=l_{max}-1$, $a_{l_{max}}=f$, the lifted wavelets can be obtained by iterating the process in FIG. 4, where $\tilde{a}_l$ and $\tilde{d}_l$ denote the vectors of all approximation and detail coefficients of the original HT transform respectively at level l.

Given n training functions $\{f^n\}$, the linear operators $U_l$ and $P_l$ can be learned by solving the minimization problem:

$$\{U_l, P_l\} = \arg\min_{U_l, P_l} \Sigma_n z(\tilde{d}_l^n - P_l(\tilde{a}_l^n + U_l \tilde{d}_l^n)), \qquad (7)$$

where z can be any sparse penalty function. Then the representation basis can be obtained by running the inverse process of FIG. 4.

However, the GDL framework as expressed in Equation (7), does not solve the problem of how to generally decompose an irregular underlying graph for constructing wavelets, but rather assumes that such a hierarchical decomposition of the underlying irregular and connected graph into connected regions is already provided in advance for the use of framework. Indeed, it is nontrivial to find an appropriate hierarchical decomposition of any highly irregular large-size graph in a general way. To overcome this difficulty, the GLE algorithm is developed to enable the partitioning of the multiscale structure imposed on the underlying irregular graph.

Figure 5:
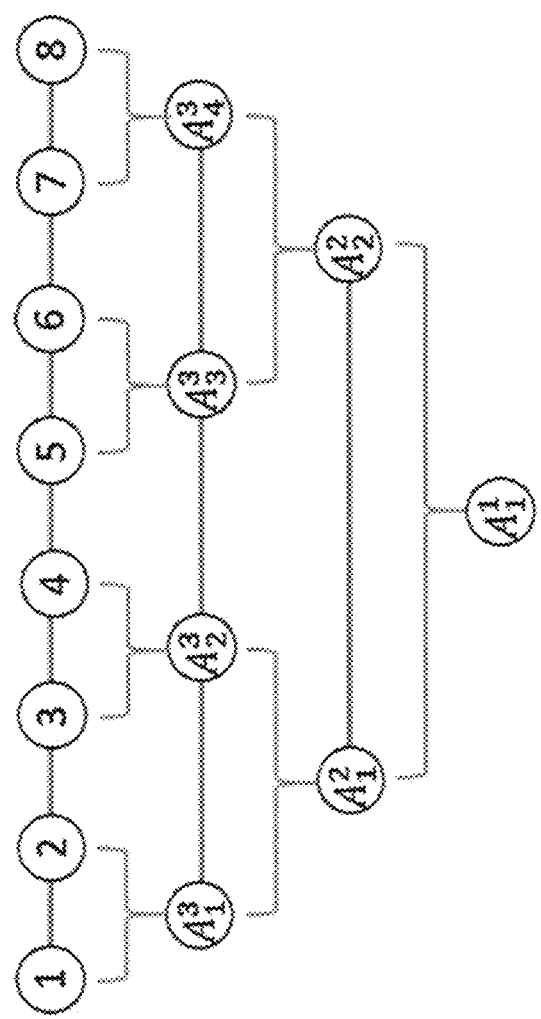
FIG. 5 is a conceptual diagram illustrating a multiresolution decomposition of 1-dimensional space into a hierarchical structure.

The idea is to first embed the underlying irregular and connected graph into a linear graph (e.g., 1-dimensional space), in which any two consecutive vertices in this 1-dimensional space are connected in the original graph. Then, signals on the original underlying irregular graph are now defined on the 1-dimensional regular space. Therefore, a standard multiresolution decomposition, such as the tree algorithm introduced by Mallat, can be readily applied to generate a feasible hierarchical structure of signals on this transformed linear embedding graph, an approximate of the original underlying graph, upon which HT and Equation (7) can be applied. FIG. 5 shows an example multiresolution decomposition of 1-dimensional space into a hierarchical structure, where $A_i^l$ denotes a connected segment at level $l=1, \ldots, l_{max}$ including nodes 1 to 8.

According to some embodiments, the operation of the GLE algorithm is presented by considering the problem of finding a walk path by visiting through all the vertices on the irregular and connected graph in an optimal way to reserve vertices' neighborhood information. This problem can be formulated as getting a labeling of the vertices which would closely reflect the structure of the graph. The problem can be related to a graph labeling problem known as the cyclic bandwidth sum problem. It consists of finding a labeling of the vertices of an undirected and unweighted graph with distinct integers such that the sum of (cyclic) difference of labels of adjacent vertices is minimized. Thus, given an undirected and connected graph G(V, E) with vertex set $V=\{u_i \in V | 1 \le i \le n\}$ and edge set E, the GLE algorithm is given as follows.

(I) Find the vertex $u_1$ with the smallest degree. Initialize list $A=\{u_1\}$, list $B=\{u_2, u_3, \ldots, u_n\}$, and stack $C=\{u_1\}$. List A keeps the vertices which have already been visited along the walk, while list B keeps the remaining ones not traversed yet. The current vertex is defined as the top vertex in stack C. Stack C maintains the current walk path segment from the bottom vertex in the stack to the current vertex on top of the stack for further check.

(II) Search a vertex $u_j$ in list B that matches the following conditions: (i) $u_j$ is adjacent to the current vertex $u_i$; and (ii) $u_j$ has a neighborhood that is the most similar to the one of $u_i$. Let Adj(u) return the all adjacent vertices of the vertex u. The similarity index between vertices u and v, denoted as J(u, v) is defined by:

$$J(u, v) = \frac{\#(Adj(u) \cap Adj(v) \cup \{u, v\})}{\#(Adj(u) \cup Adj(v))}. \qquad (8)$$

In other words, the search is for vertex $u_j$ in B, which satisfies:

$$u_j = \arg\max_v J(u_i, v) \text{ s.t. } v \in Adj(u_i). \qquad (9)$$

(III) If such a vertex $u_j$ in B is found, add $u_j$ into list A and then remove it from list B. Push $u_j$ to stack C. If no vertex in B is found adjacent to the current vertex $u_i$, pop $u_i$ out from stack C, and add the new current vertex in stack C into list A.

(IV) If B is not empty, repeat steps (II) and (III). If B becomes empty, the ordered sequence of vertices in A then forms the embedded 1-dimensional linear topology structure of the given irregular graph.

When a walk is generated by the GLE algorithm for the given connected graph, any two consecutive vertices in the resulting 1-dimensional topology structure are connected in the original graph.

Given a connected graph G(V, E) with vertex set V={$u_i$ ∈V|1≤i≤n} and edge set E, where the cardinality of |E|=m, the GLE algorithm can generate a walk path with the total time complexity in O(mn). This has shown the case when the walk path does not include any revisiting vertex.

Now consider the additional time complexity when revisit is needed to find a path. From step (III) of the GLE algorithm, a vertex revisit means that a stacked vertex is revisited. A vertex is only popped out from stack C when no any vertex in list B is adjacent to this vertex. Assuming that there are $n_{B_i}$ vertices in B, then $O(n_{B_i})$ time is needed to verify that no any vertex in list B is adjacent to this vertex. Assume $n_{p_i}$ vertices have to be popped out from C until the next adjacent vertex in B is found, and the current revisiting top vertex in C is $u_c$, then the popping out time complexity is in $O(n_{p_i} \times n_{B_i})$. Since for $\forall v \in \{Adj(u_c) \cap B\}$, $J(u_c, v)$ has been calculated when $u_c$ was pushed into stack C, then only $O(n_{B_i})$ time is needed to find the next adjacent vertex in B which satisfies Equation (9). Thus, the additional time complexity to find next vertex is in $O(n_{p_i} \times n_{B_i} + n_{B_i})$. The total additional time complexity of revisiting is in $O(\Sigma_i (n_{p_i}+1) \times n_{B_i})$. $\forall i, n_{B_i} < n$, such that $\Sigma_i ((n_{p_i}+1) \times n_{B_i}) < \Sigma_i (n_{p_i}+1) \times n$.

From step (III) of the GLE algorithm, any vertex can only be pushed to stack C once, so any vertex can be popped out from the stack C no more than once. Hence, the total number of pop-out vertices: $\Sigma_i n_{p_i} < n$ and $\Sigma_i 1 < n$, then $\Sigma_i (n_{p_i}+1) = \Sigma_i n_{p_i} + \Sigma_i 1 < n+n = 2n$. Finally, $\Sigma_i ((n_{p_i}+1) \times n_{B_i}) < (\Sigma_i (n_{p_i}+1)) \times n < 2n^2$. Therefore, the additional time complexity is in $O(n^2)$ when revisit is needed. There total time complexity of the GLE algorithm is in $O(mn+n^2)=O(mn)$.

In various embodiments, given a WSN deployment, an important consideration is how to construct the underlying graph of sensor signals, from which an appropriate representation basis Ψ can be obtained. To start, the routing topology is recovered at the sink for each data collection cycle in the WSN, which forms a routing topology graph (RTG). Next, each directed edge in the RTG is changed to an undirected edge to get the corresponding undirected RTG, denoted as URTG. To maximize the incoherency between Ψ and Φ, the underlying graph is constructed as the complement graph (CG) of the WSN URTG in building a sparse representation basis Ψ based on graph wavelets via deep machine learning.

Let P training datasets be collected from the WSN deployment for constructing Ψ. A training dataset corresponds to a URTG graph $G_i=(V, E_i), i \in \{1,2,\ldots,P\}$. The union of these P graphs is:

$$G_U=(V,E_U), \qquad (10)$$

where $E_U = E_1 \cup E_2 \cup \ldots \cup E_P$. The complement graph CG of $G_U$ is:

$$CG_U=\tilde{G}_U=(V,E_{CG}), \qquad (11)$$

where (i,j) ∈ $E_{CG}$, if and only if (i,j) ∉ $E_U$.

The $CG_U$ is the constructed underlying graph from P WSN URTGs from training datasets for building the sparse representation basis Ψ, whose Laplacian matrix $L_{CG}$ will be needed to build the wavelets. For an undirected graph G=(V, E) along with a weight function w: E→ℝ⁺, where ℝ denotes the set of positive real numbers, the adjacency matrix $A_G$ of G is:

$$A_G(i,j) = \begin{cases} w(i,j) & \text{if } (i,j) \in E \\ 0 & \text{otherwise} \end{cases}. \qquad (12)$$

The degree matrix $D_G$ of a weighted graph G is a diagonal matrix such that:

$$D_G(i,i)=\Sigma_j A_G(i,j). \qquad (13)$$

The Laplacian matrix $L_G$ of a weighted graph G is defined as $L_G=D_G-A_G$.

Let the weight of all the edges be equal to 1, then the adjacency matrix $A_{CG}$ of the complement graph $CG_U$ is:

$$A_{CG}(i,j) = \begin{cases} 1 & \text{if } (i,j) \in E_{CG} \\ 0 & \text{otherwise} \end{cases}. \qquad (14)$$

With $D_{CG}(i,i) = \Sigma_j A_{CG}(i,j)$, the Laplacian matrix of the complement graph of routing is $L_{CG}=D_{CG}-A_{CG}$, which will be used to find the sparse representation basis.

According to some embodiments, the CS technique of the present disclosure was deployed in a real-world outdoor multi-hop WSN for environmental monitoring, where the data recovery performance was evaluated by comparing to three existing CS schemes such as CDG, RS-CS, and CDC.

Figure 6:
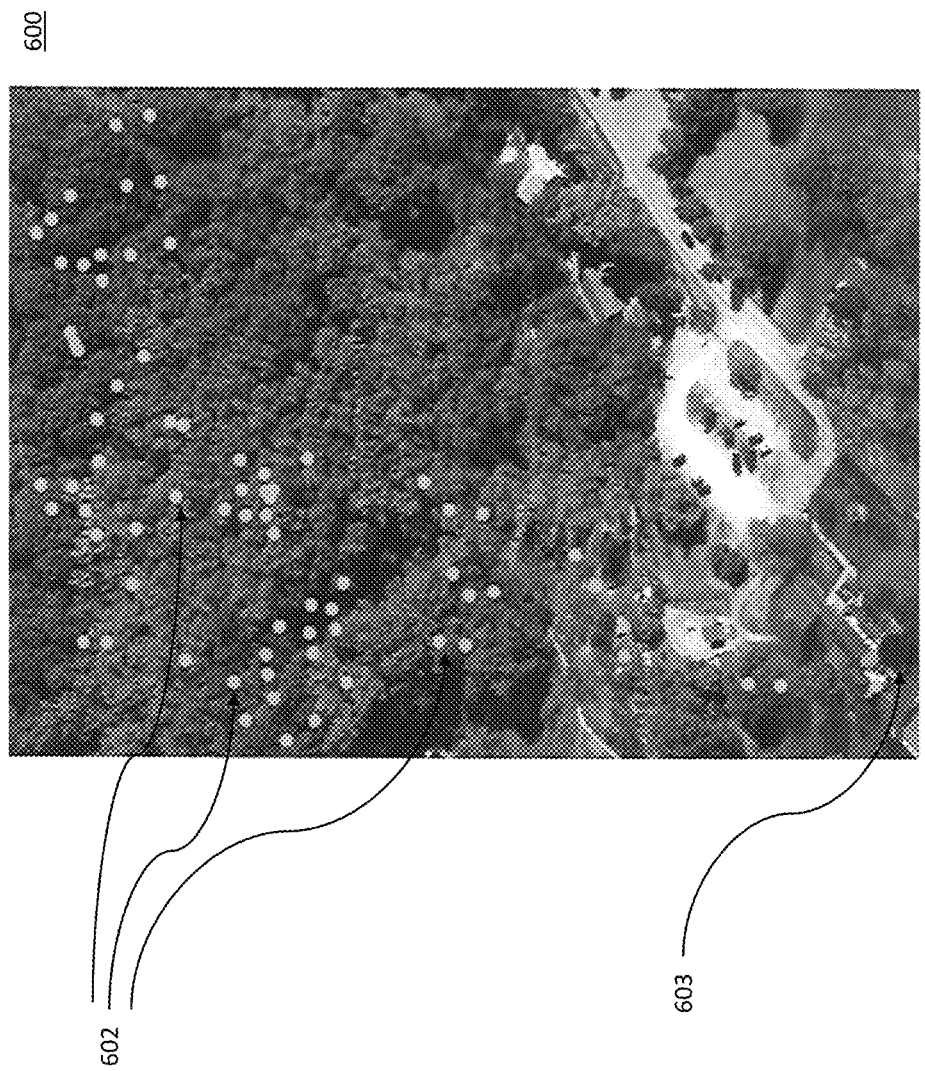
FIG. 6 is a picture illustrating a WSN testbed.

FIG. 6 illustrates a WSN testbed 600 that includes various sensor nodes 602 and a base node 603. As an example, the sensor nodes 602 are similar to the sensor nodes 102A-102N of FIG. 1, while the base node 603 is similar to the base node 103 of FIG. 1. According to some examples, the WSN testbed 600 is deployed for calibrating and validating scientific models in hydrology research. Nearly 80 heterogeneous sensor nodes 602 (e.g., MICAz, IRIS, TelosB motes) are deployed in the WSN testbed 600. The only energy source available for each node is provided by three NiMH AA rechargeable batteries with a nominal capacity of 2700 mAh. Each MicaZ and IRIS mote is equipped with an MDA300 data acquisition board. The MDA300 provides embedded temperature and humidity sensors. MicaZ and IRIS motes have 4K bytes and 8K bytes memory, respectively. TelosB motes are equipped with their own embedded temperature and humidity sensors. Both TelosB motes and MDA300 acquisition boards have ADCs for external sensors (e.g., EC5 (soil moisture sensor)). The base node 603 (e.g., sink) is a base station for the sensor nodes 602. The base node 603 is an IRIS mote with a permanent power supply. The base node 603 is connected to a computer (e.g., computing device 118 of FIG. 1) operated as a WSN gateway, where the WSN gateway forwards the sensed data stream to a WSN data management system (e.g., data management system 106 of FIG. 1) over the Internet.

Experiments to validate the WSN testbed 600 were developed using TinyOS 2.1.2. The deployed routing protocol at the WSN testbed 600 used an extended CTP with energy efficient and balance routing (referred to as CTP+EER), which introduces a random component into the CTP process of packet forwarding to achieve a better traffic and energy balance. In each data collection cycle from M packets received at the base node 603, a Routing Topology Recover (RTR) scheme was used to reconstruct each per-packet routing path. In the RTR implementation, four bytes are used for carrying path measurement independent of the actual hop counts of the routing path, piggy back to each data packet routed towards the base node 603.

Data collected in one collection cycle of the WSN testbed 600, where each sensor node 602 sampled and sent its sensor readings once, formed a dataset. A total of 87 datasets were collected from the WSN testbed 600 in situ for 87 cycles. Table 1 shows the statistics of per-packet routing path recovery by RTR conducted on the WSN testbed 600 in situ. The longest routing path of packet had 8 hops.

TABLE 1

| | |
|---|---|
| Total cycles | 87 |
| Average path recovery ratio | 98.38% |
| Best cycle recovery | 100% |
| Worst cycle recovery | 93.20% |

Figure 7:
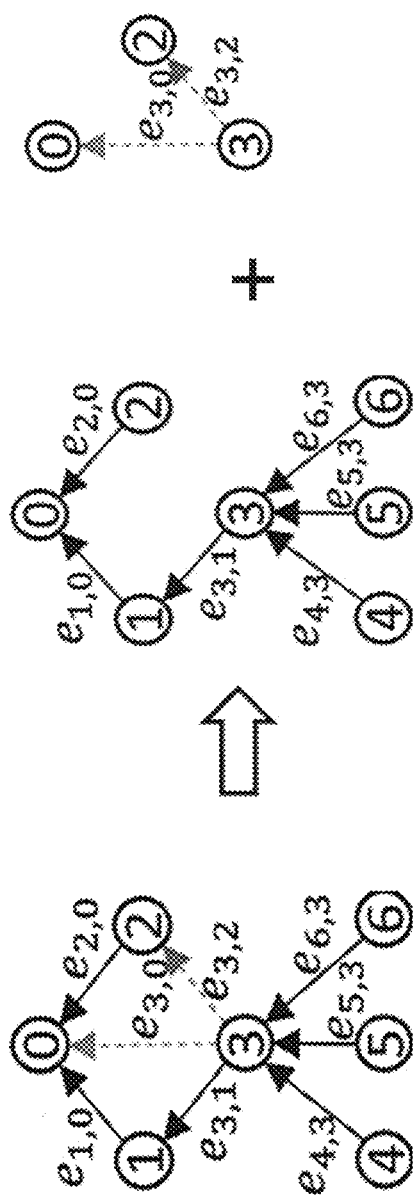
FIG. 7 is a conceptual diagram illustrating a sensor network acyclic routing topology.

Outdoor WSN routing is highly dynamic due to wireless link dynamics. In general, an acyclic dynamic routing topology G can be represented as a (directed) spanning tree augmented with some additional edge(s), in which these additional edge(s) are referred to as "shortcut(s)." An illustration of a WSN acyclic routing topology is shown in FIG. 7, where a spanning tree is augmented with two additional edges or shortcuts (e.g., see dotted edges $e_{3,0}$ and $e_{3,2}$).

A WSN routing topology for a given time duration (e.g., a collection cycle) can be viewed as a static routing tree (if no presence of routing dynamics), plus additional shortcuts indicating the routing dynamics. Let TL and SC denote the total wireless links and the number of shortcuts involved in a WSN dynamic routing topology G in a time duration T, respectively. Then, WSN routing dynamics for a given duration T can be measured in terms of short cut rate (SCR) defined as follows:

$$SCR = \frac{sc}{TL}. \quad (15)$$

Figure 8:
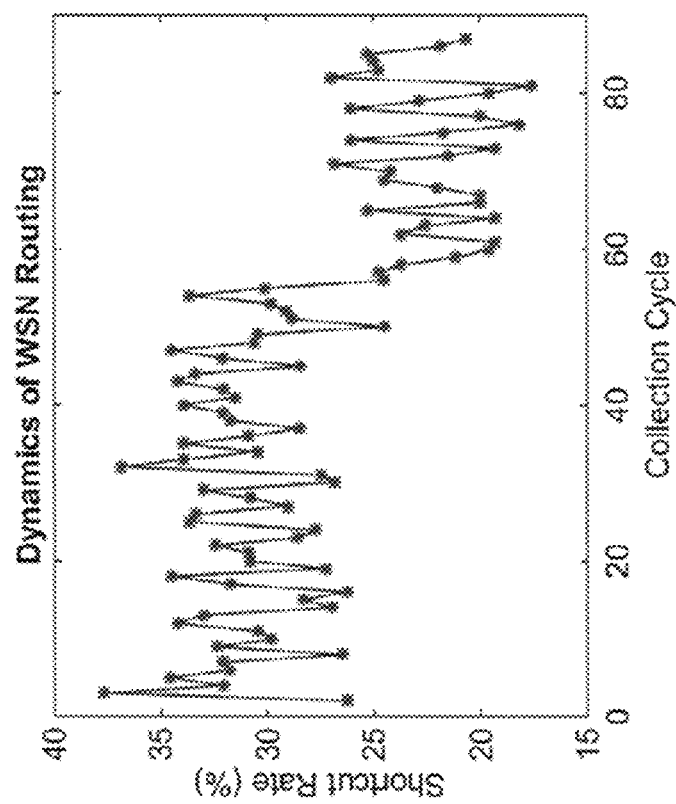
FIG. 8 is a graph illustrating routing dynamics of the WSN testbed of FIG. 6.

When a WSN routing topology is static, its SCR=0; the larger value of SCR, the higher dynamics of WSN routing. FIG. 8 shows the routing topology dynamics of the WSN testbed 600 for the total 87 cycles. As can be seen, the network routing topology keeps changing through all collection cycles during the experiments.

According to certain embodiments, the first 10 collected datasets were used as the training datasets for constructing the representation basis while the remaining 77 datasets were used as the test datasets for data recovery performance. Humidity data were collected from 75 sensor nodes, while soil moisture data were collected from 48 sensor nodes equipped with external soil moisture sensor EC5. The original sensor readings of each node were also collected in the same data packet in each cycle in addition to the compressed sensor data to provide the base for the accuracy analysis.

As described herein, s is the N×1 coefficient vector in the Ψ-domain with $\|s\|_o$=k, where k<<N. By keeping only the largest k components in magnitude in s, the approximation s' and s, and thus the approximation x'=Ψs' can be obtained. Comparing x' with x gives the performance of the representation basis Ψ.

As an example, the representation basis Ψ is constructed as follows. First, construct the underlying graph of WSN based on Equations (10) and (11) with recovered WSN URTGs from path measurements in the given training datasets. Second, use the GLE algorithm to obtain an appropriate hierarchy decomposition of the underlying graph. Third, apply GDL to the hierarchy decomposition of the underlying graph to construct graph wavelets with the given WSN training datasets. Finally, construct the sparse representation basis based on the constructed graph wavelets.

Figure 10:
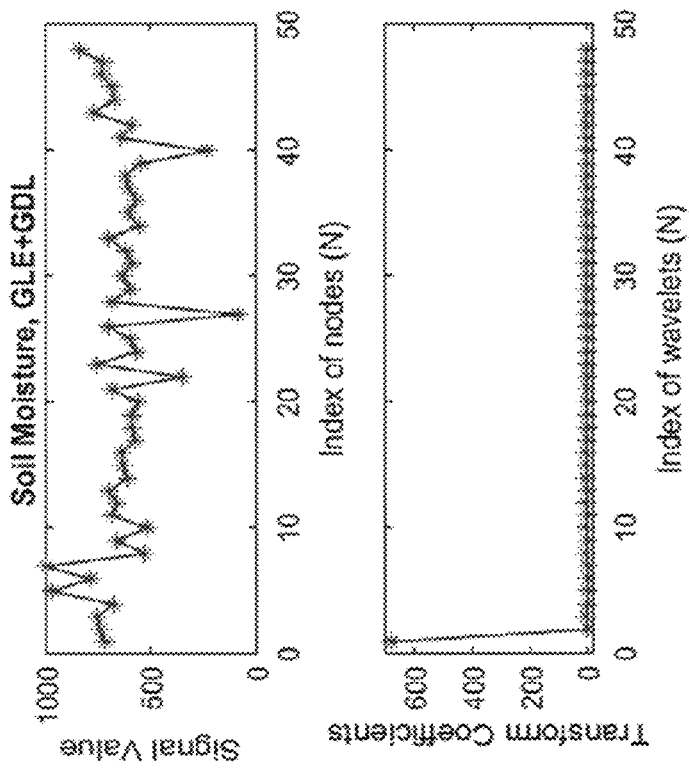
FIG. 10 is a graph illustrating soil moisture data and corresponding transform coefficients.
Figure 9:
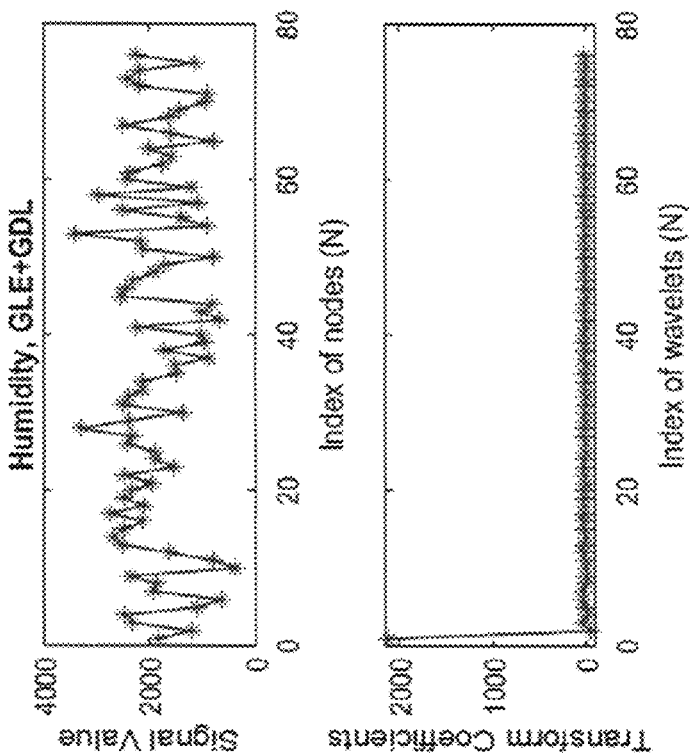
FIG. 9 is a graph illustrating humidity data and corresponding transform coefficients.

FIG. 9 shows an example of the humidity data collected from 75 sensor nodes and the corresponding transform coefficients for the representation basis obtained with the 10 training datasets for humidity. Similarly, FIG. 10 shows an example of the soil moisture data from 48 sensor nodes and the corresponding transform coefficients for the representation basis obtained with the 10 training datasets of soil moisture. As can be seen, only very few coefficients are significant in the transform domain.

To evaluate the sparsification performance of the representation basis, the largest k transform coefficients in magnitude of both the humidity and soil moisture data were selected, respectively. The sparsification performance the representation basis was then compared to those adopting a Haar wavelet transformation and a discrete cosine transformation (DCT), which are the two transformations used in existing CS schemes such as CDC and CDG. The approximation error (%) used to evaluate the sparsification performance for the different CS approaches is defined as:

$$\text{Error} = \frac{\sqrt{\sum_N (x' - x)^2 / N}}{\sqrt{\sum_N x^2 / N}} \times 100\%. \quad (16)$$

Figure 12:
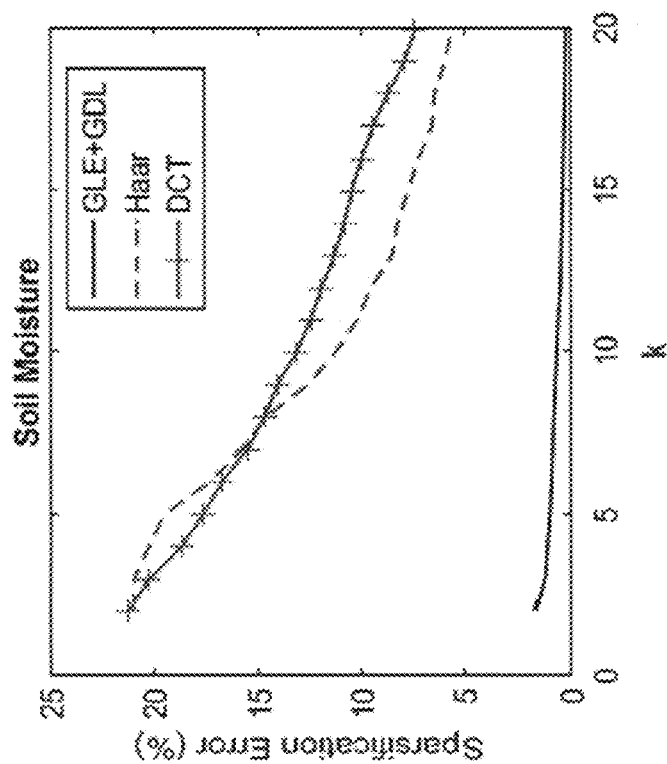
FIG. 12 is a graph illustrating sparsification error for soil moisture data.
Figure 11:
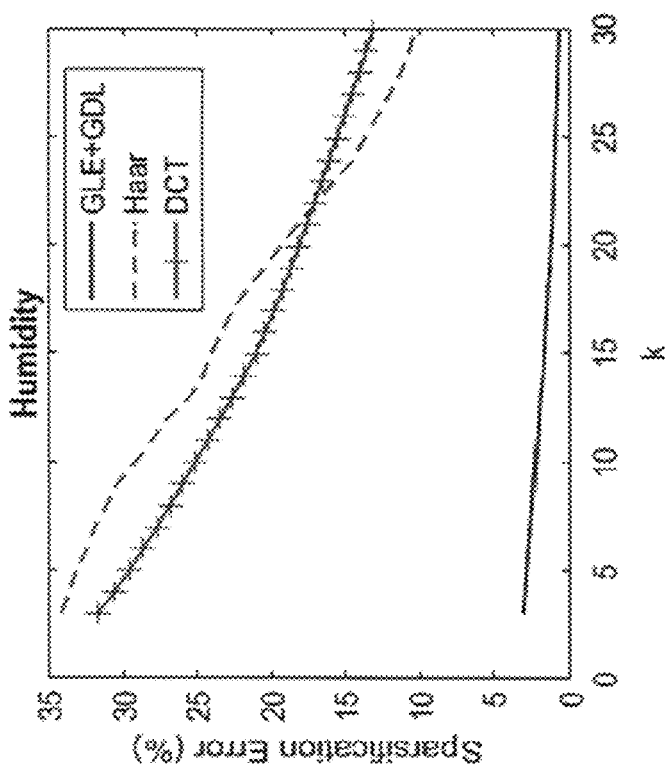
FIG. 11 is a graph illustrating sparsifcation error for humidity data.

FIGS. 11 and 12 show the average sparsification errors of the 77 test datasets for humidity and soil moisture signals, respectively for GLE+GDL (e.g., GLE algorithm plus graph wavelets via deep machine learning by GDL), Haar transformation, and DCT. As can be seen, the representation basis constructed by GLE+GDL can always lead to very small approximation error even when only keeping a few largest transform coefficients in magnitude (e.g., largest k components in magnitude s). While the performances of all the different representation bases are improved when k becomes larger, the representation basis by GLE+GDL always significantly outperforms the Haar transformation and DCT. The results for GLE+GDL are also very stable on both the humidity and soil moisture datasets. For example, in the humidity data, when keeping only the largest three transform coefficients in magnitude (out of total 75), the approximation error is less than 3.3%. In the soil moisture data, when keeping only the largest two transform coefficients in magnitude (out of total 48), the approximation error is always less 1.7%. This indicates that the humidity and soil moisture signals can be sparsely represented by using their respective basis obtained based on GLE+GDL.

According to some embodiments, the signal recovery accuracy is determined by first collecting M(M<N) measurements $y=[y^1, y^2, \ldots, y^M]^T$ from the WSN testbed 600 in each cycle and recovering the routing path of each received data packet using the RTR scheme, from which the measurement matrix Φ is reconstructed for the sensor dataset in this cycle. Note that if any node is revisited when using the GLE algorithm, the constructed representation basis Ψ is an N'×N' matrix where N'>N. In this case, the measurement matrix Φ should be expanded accordingly from M×N dimension to M×N' dimension. Afterward, two CS solvers SL0 and LP are used to obtain an approximation s' of s in the transform domain. Finally, the original signal is recovered by computing $x'=\Psi s'$. The signal recovery accuracy is then evaluated using the approximation error as defined in Equation (16).

According to certain embodiments, to evaluate the CS technique in the present disclosure, also called CSR, three existing CS schemes namely CDG, RS-CS (with Horz-diff transformation), and CDC are used for comparison. While the CDC and RS-CS approaches interplay with routing, CDG does not. Instead, CDG relies on dense random projections which need to collect data from all WSN nodes.

Figure 13:
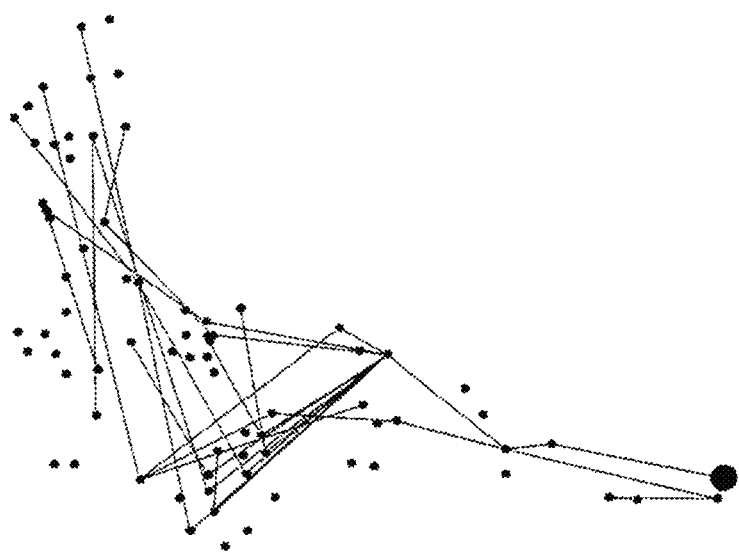
FIG. 13 is a graph illustrating a routing topology for a data collection cycle in the WSN testbed of FIG. 6.
Figure 15:
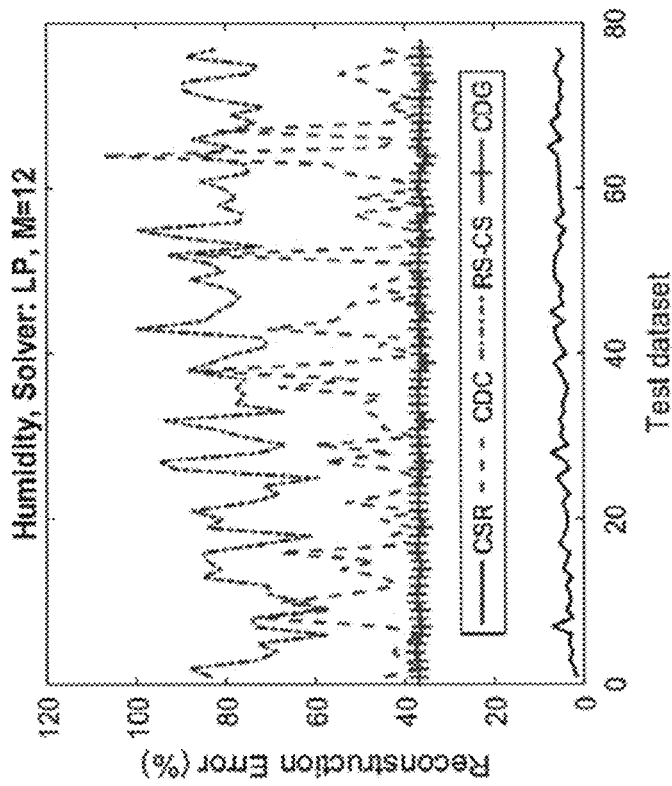
FIG. 15 is a graph illustrating humidity dataset reconstruction error using LP solver.
Figure 14:
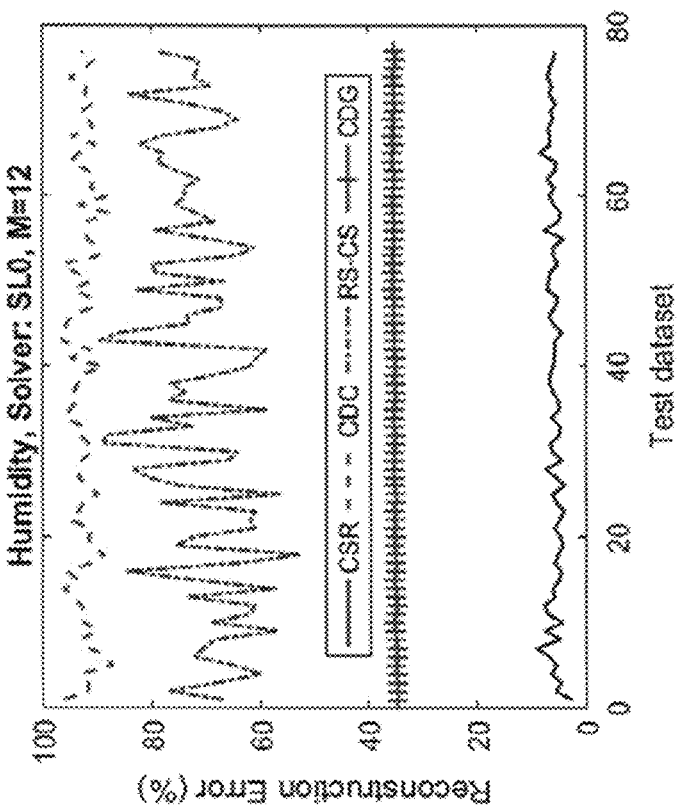
FIG. 14 is a graph illustrating humidity dataset reconstruction error using SL0 solver.
Figure 17:
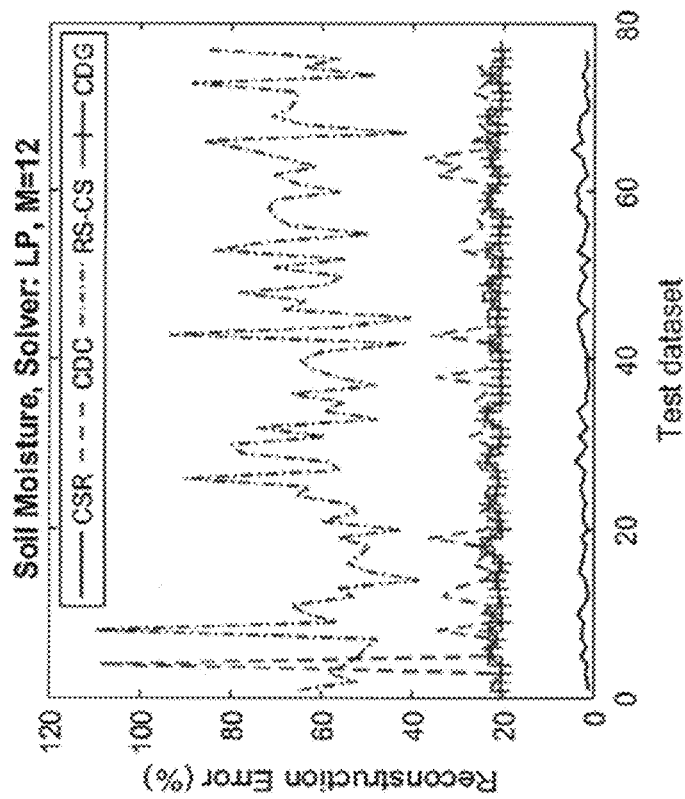
FIG. 17 is a graph illustrating soil moisture dataset reconstruction error using LP solver.
Figure 16:
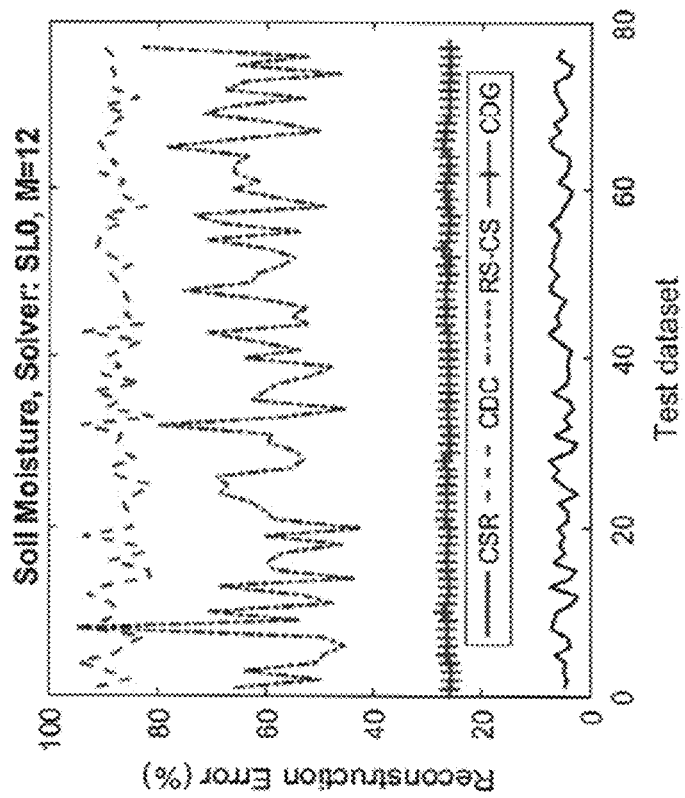
FIG. 16 is a graph illustrating soil moisture dataset reconstruction error using SL0 solver.
Figure 19:
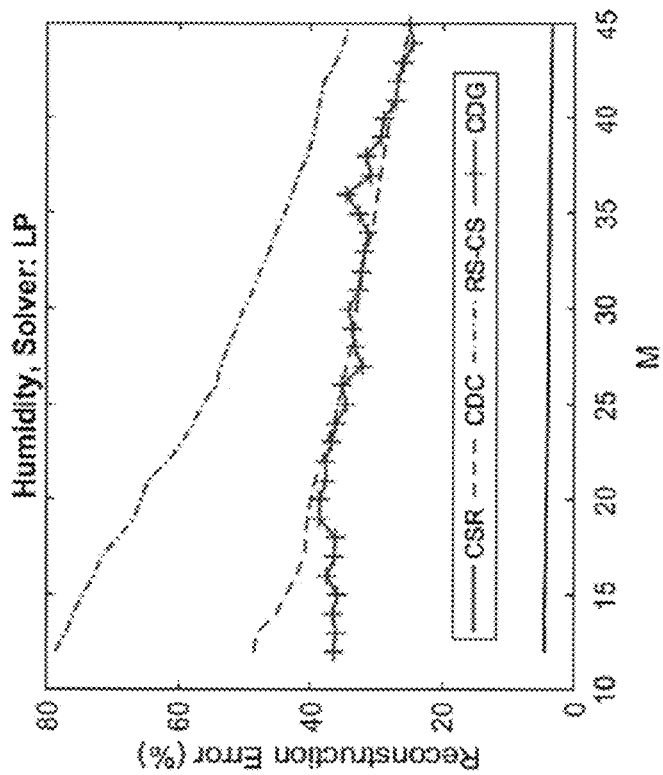
FIG. 19 is a graph illustrating humidity dataset reconstruction error with different number of measurements using LP solver.
Figure 18:
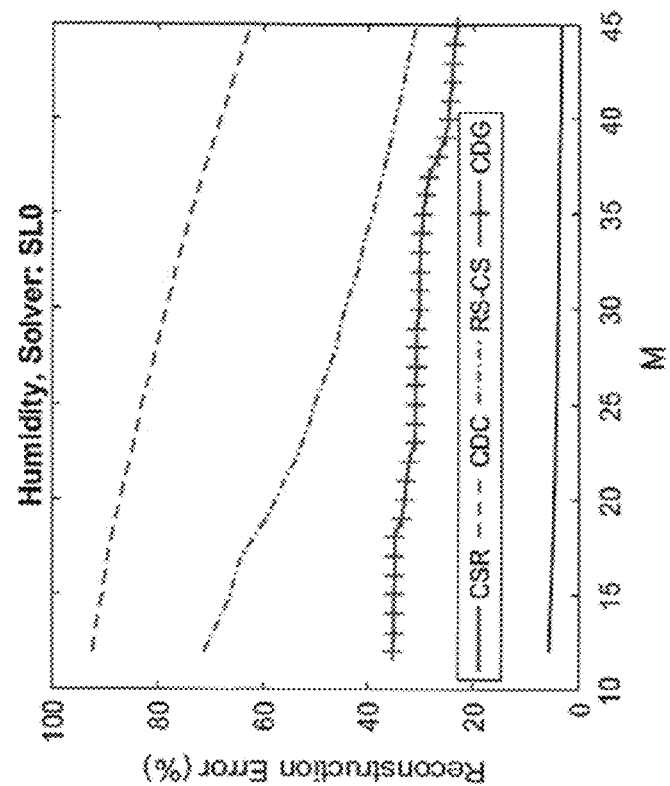
FIG. 18 is a graph illustrating humidity dataset reconstruction error with different number of measurements using SL0 solver.

To begin, M=12 for both humidity and soil moisture data was used for data collection. FIG. 13 shows an example of the WSN routing topology for the 12 measurements collected from the WSN testbed 600 of FIG. 6, which was reconstructed by the RTR scheme. As can be seen, many sensor nodes in the WSN testbed 600 were not visited in the data collection cycle, which means their data were not collected in the CSR, CDC, and RS-CS approaches. Having fewer visited sensor nodes can generally make it harder to recover the entire data field.

FIGS. 14-17 show the reconstruction errors for humidity and soil moisture signals by using the four different CS approaches (e.g., CSR, CDG, RS-CS, CDC), with two solvers SL0 and LP. As can be seen, the CSR approach of the present disclosure with the LP solver can always achieve a data recovery with the error being less than 7.7% on the humidity datasets and less than 5.0% on the soil moisture datasets for any collection cycle. This significantly outperforms the existing CS schemes of CDG, RS-CS and CDC. Note that both CDC and RS-CS perform worse than CDG and they are sensitive to different datasets collected in different cycles because only a subset of the nodes was visited in each individual collection cycle. By contrast, the CSR approach overcomes this problem by constructing a much better representation basis. Therefore, CSR always outperforms the other three existing CS schemes for both humidity and soil moisture data. Note that the CDC scheme is also very sensitive to different solvers as it performs much better with the LP solver than with the SL0 solver. Generally, the LP solver outperforms the SL0 solver, but the LP solver takes longer computation time.

FIGS. 18-21 show the reconstruction errors for humidity and soil moisture signals by using the four different CS approaches (e.g., CSR, CDG, RS-CS, CDC), with different numbers (M) of collected measurements. As can be seen, the CSR approach of the present disclosure has excellent performance even when M is very small, with reconstruction errors being an order of magnitude less than those of the other three existing CS schemes of CDG, RS-CS and CDC with much larger M. Generally, the performance will improve when M becomes larger, the only exception is the CDG scheme with the LP solver on soil moisture data.

Figure 21:
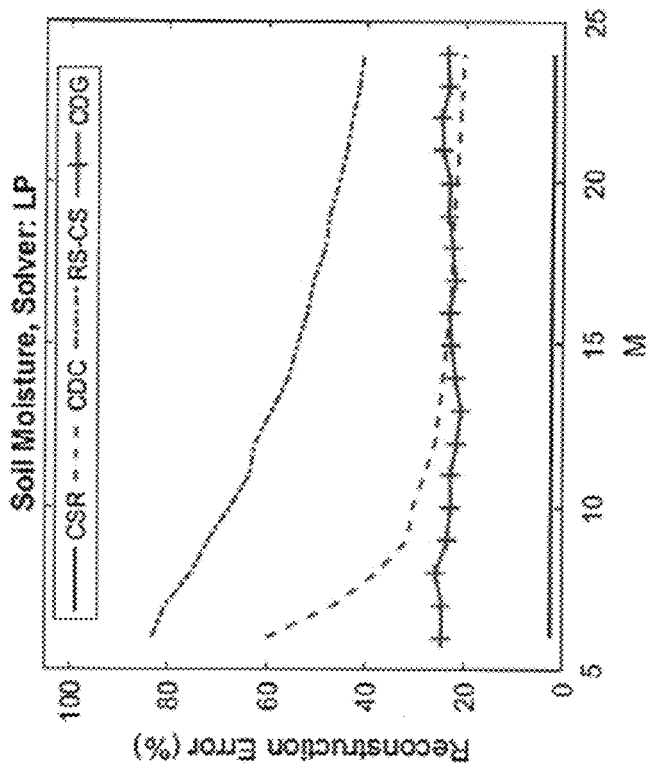
FIG. 21 is a graph illustrating soil moisture dataset reconstruction error with different number of measurements using LP solver.
Figure 20:
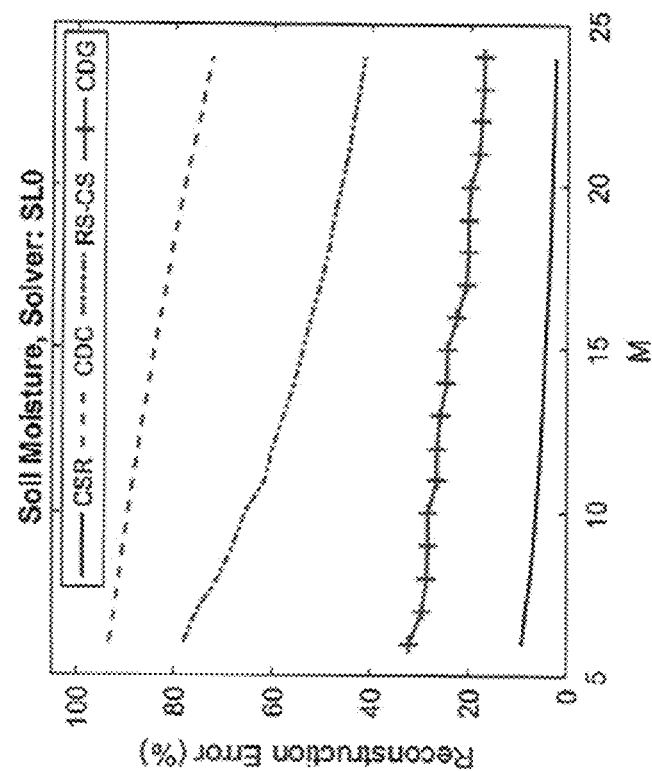
FIG. 20 is a graph illustrating soil moisture dataset reconstruction error with different number of measurements using SL0 solver.
Figure 22:
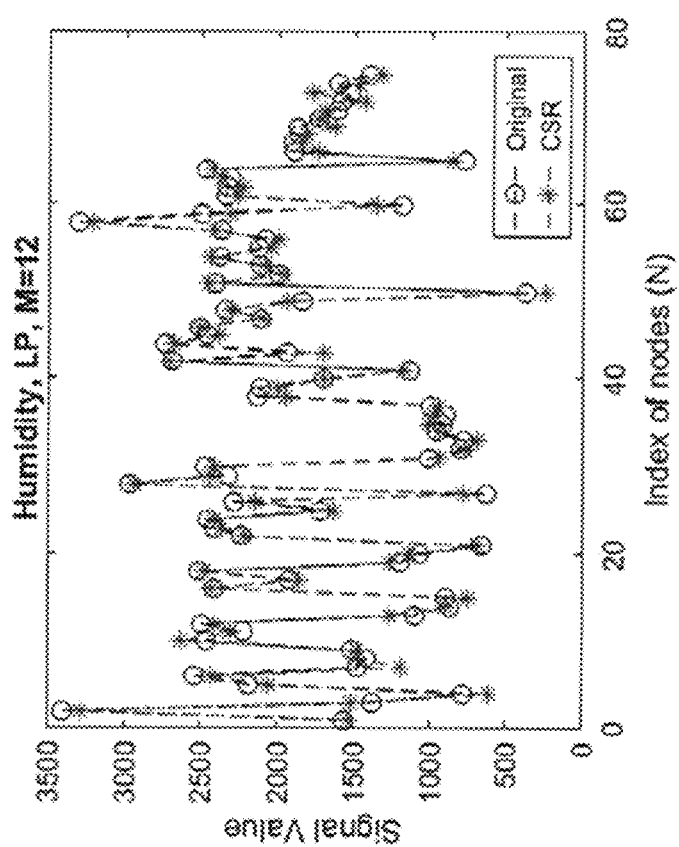
FIG. 22 is a graph illustrating comparison between original and reconstructed signal.

FIG. 21 shows an example of the reconstructed humidity data by the CSR approach of the present disclosure when only 12 data packets are collected at the sink in comparison with the original humidity data. As can be seen, while the original humidity data change drastically from sensor node to sensor node, the CSR approach is still able to recover the entire data field (75 nodes) with a high fidelity by using only 12 measurements.

Figure 24:
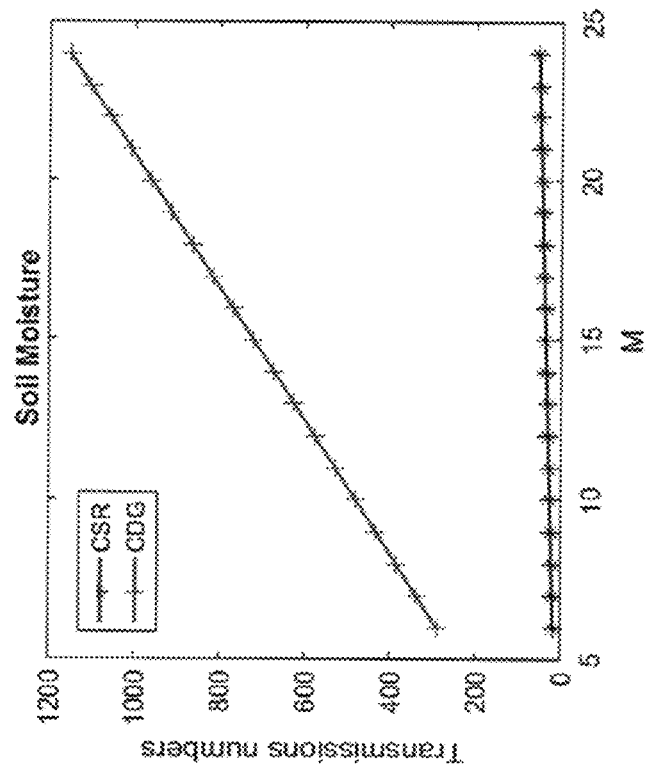
FIG. 24 is a graph illustrating data packet transmission numbers on soil moisture dataset.
Figure 23:
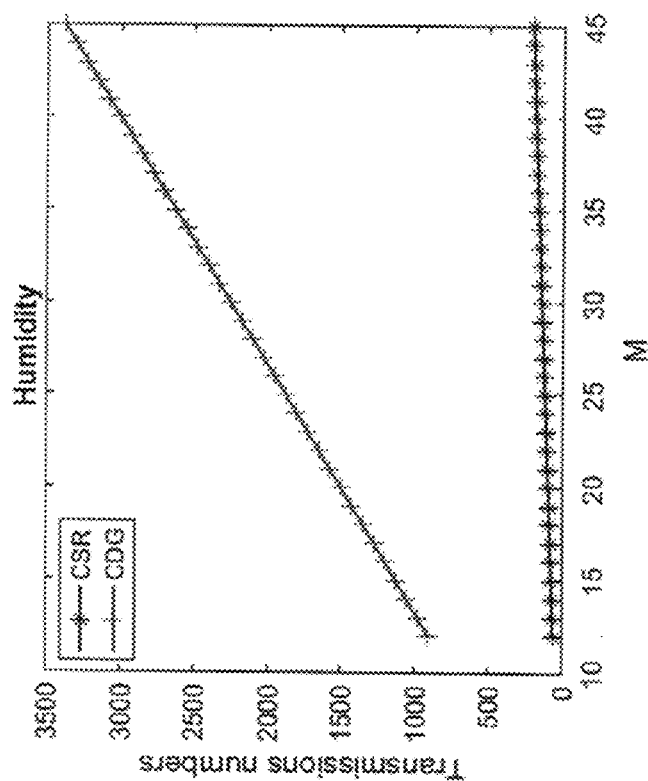
FIG. 23 is a graph illustrating data packet transmission numbers on humidity dataset.

FIGS. 23 and 24 show the data packet transmission numbers of the CSR approach of the present disclosure versus the CDG scheme for collecting humidity and soil moisture measurements, respectively, for different numbers of received measurements. As can be seen, the CSR approach leads to a drastic reduction of the number of data packet transmissions by an order of magnitude less than those of the CDG scheme. This indicates drastic radio communication energy conservations by the CSR approach, which is a great advantage of any CS technique if successfully interplaying with routing. While both the CDC and RS-CS schemes have the same transmissions as CSR, due to the employment of the same routing protocol CTP+EER for CDC and RS-CS as well, CDC and RS-CS have significantly larger data packet sizes than that of CSR. This is because CDC and RS-CS record the original packet path in the data packet along the route, whereas the CSR approach of the present disclosure uses routing topology tomography for path information. Consequently, the CSR approach of the present disclosure is not only scalable for large-size WSNs and big data acquisition, but is also more resource efficient than existing schemes such as CDC and RS-CS.

As described herein, rigorous validation and evaluation of the CSR approach versus three existing CS schemes such as CDG, CDC and RS-CS were conducted in a real-world outdoor WSN deployment in situ. The results demonstrate that the CSR approach of the present disclosure significantly outperforms CDG, CDC and RS-CS by reducing data reconstruction errors by an order of magnitude for the entire WSN data field, while also reducing wireless communication costs by an order of magnitude at the same time. This indicates that the CSR approach is a reliable and practical solution to energy efficient data acquisition in multi-hop large-scale WSNs. The CSR approach can successfully recover the entire data field the real-world multi-hop WSN in situ with very small errors, when only 16% of data packets (e.g., 12 randomly selected nodes out of a total 75 sensor nodes in the WSN testbed 600) need to be collected at the sink.

Figure 25:
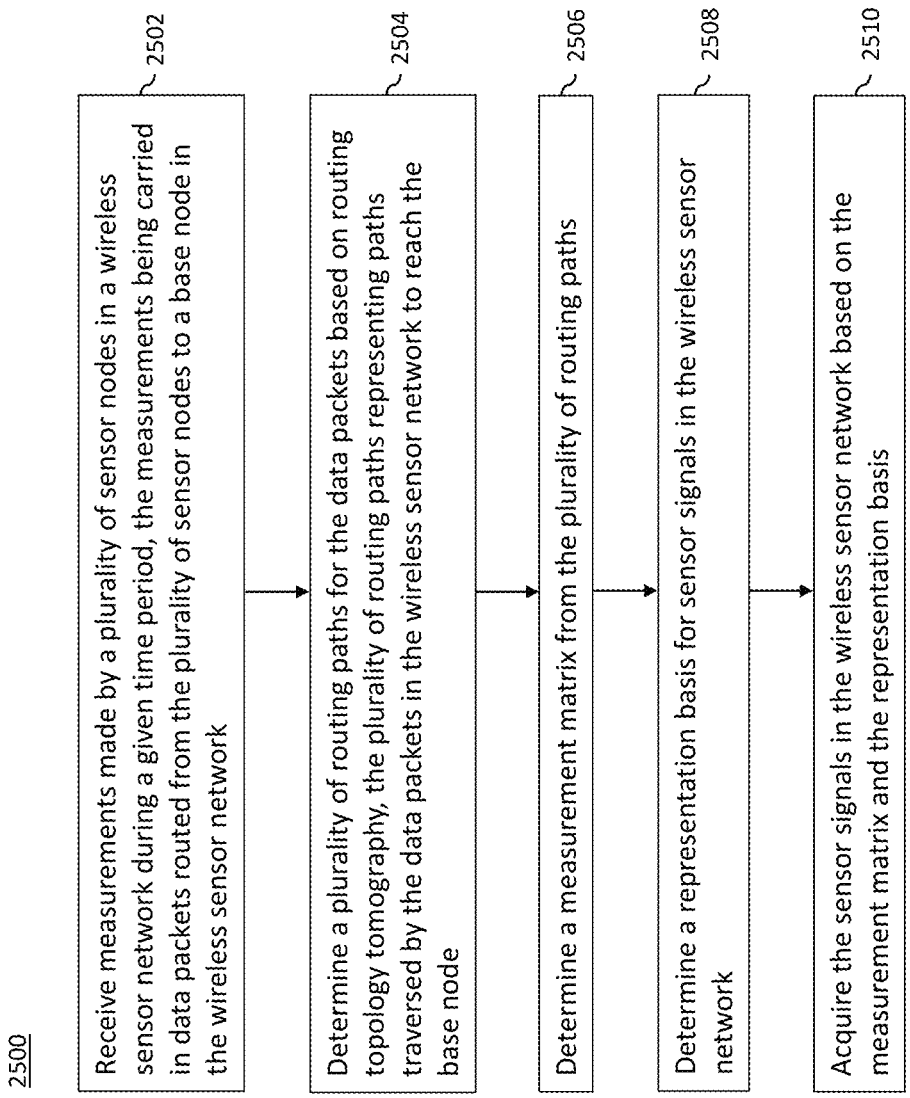
FIG. 25 is a flow chart illustrating a method for data acquisition in WSNs.

FIG. 25 illustrates a method 2500 for data acquisition in WSNs. As an example, the method is performed by a computing device and/or system (e.g., 118, 106). At block 2502, the method receives measurements made by a plurality of sensor nodes (e.g., 102A-102N) in a WSN (e.g., 102) during a given time period (e.g., data collection cycle). The measurements are carried in data packets that are routed from the plurality of sensor nodes to a base node (e.g., 103) in the WSN.

At block 2504, the method determines a plurality of routing paths for the data packets based on routing topology tomography. The plurality of routing paths represent paths traversed by the data packets in the WSN to reach the base node. In some embodiments, each of the plurality of routing paths is defined in terms of a plurality of intermediate nodes traversed by a respective data packet in reaching the base node. The measurements carried in the respective data packet are aggregated at each of the plurality of intermediate nodes. In certain embodiments, determining the plurality of routing paths is further based on routing protocol information (e.g., CTP+EER).

At block 2506, the method determines a measurement matrix (e.g., $\Phi$) from the plurality of routing paths. In some embodiments, a routing matrix is calculated based on the plurality of routing paths and the routing matrix is adopted as the measurement matrix.

At block 2508, the method determines a representation basis (e.g., $\Psi$) for sensor signals in the WSN. In some embodiments, the representation basis is constructed by determining an underlying graph based on the plurality of routing paths, performing a hierarchy decomposition of the underlying graph, applying machine learning (e.g., GDL) to the hierarchy decomposition of the underlying graph to construct graph wavelets, and determining the representation basis based on the graph wavelets.

At block 2510, the method acquires (e.g., recovers) the sensor signals in the WSN based on the measurement matrix and the representation basis. In some embodiments, the representation basis is a sparse matrix having an optimized incoherency with the measurement matrix.

Generally speaking, CS based data acquisition in multi-hop WSN deployments has a great potential to further significantly reduce sensor nodes' transmissions via the interplaying with the network dynamic routing to facilitate wireless big data acquisition. In practice, however, two issues need to be addressed before the potential of CS based data acquisition can be realized in any large-scale real-world WSN deployments. The first issue is how to effectively obtain the dynamic routing information for each received packet at the sink, since simply recording path along the route is neither scalable nor resource-efficient. The second issue is how to design a suitable representation basis for real-world signals that has good sparsification and incoherence with the measurement matrix derived from dynamic WSN data packet routing. It has been found that commonly used transformations such as the Haar transformation, DCT, and Horz-diff transformation all suffered from large recovery errors for real WSN data.

These two issues were addressed by the CS technique of the present disclosure, also called CSR. The CSR approach has two distinguishing characteristics. First, the CSR approach introduces the use of WSN routing topology tomography and thus provides a practical and elegant solution for large-scale WSN data acquisition based on effective interplaying with dynamic routing. The adoption of a routing matrix as the measurement matrix in CS in recovering k-sparse sensor signals in WSN can achieve feasible estimation with bounded errors. As shown in the real-world experiments with the WSN testbed 600 of FIG. 6, the CSR approach not only considerably reduces transmissions, resulting in an order of magnitude less in energy consumption, but also significantly reduces transmission costs due to the use of WSN routing topology tomography. This in turn extends the lifetime of real-world outdoor WSN deployments. Second, the CSR approach provides a systematic method to construct an optimized representation basis with both good sparsification and incoherence properties for various given classes of signals to thereby reduce WSN data recovery errors. Accordingly, the CSR approach is expected to significantly improve existing CS based techniques for WSN data acquisition, and to facilitate the application of CS techniques in large-scale multi-hop outdoor WSN systems for various data gathering.

The CSR approach has been deployed for a real-world outdoor WSN testbed and has been rigorously evaluated via the WSN deployment in situ operated under a highly dynamic communication environment for environmental monitoring purposes. It is expected that the CSR approach of the present disclosure can be adopted to significantly improve data recovery fidelity in big data acquisition.

This application is intended to cover any variations, uses, or adaptations of the present disclosure using its general principles. Further, this application is intended to cover such departures from the present disclosure as come within known or customary practice in the art to which the present disclosure pertains and which fall within the limits of the appended claims.

What is claimed is:

1. A method for data acquisition in wireless sensor networks, the method comprising:
   receiving measurements made by a plurality of sensor nodes in a wireless sensor network during a given time period, the measurements being aggregated and carried in data packets routed from the plurality of sensor nodes to a base node in the wireless sensor network;
   determining a plurality of routing paths for the data packets based on routing topology tomography, the plurality of routing paths representing paths traversed by the data packets in the wireless sensor network to reach the base node;
   determining a measurement matrix from the plurality of routing paths;
   determining a representation basis for sensor signals in the wireless sensor network using graph wavelets; and
   acquiring the sensor signals in the wireless sensor network based on the measurement matrix and the representation basis.

2. The method of claim 1, wherein determining the measurement matrix further comprises:
   calculating a routing matrix based on the plurality of routing paths; and
   adopting the routing matrix as the measurement matrix.

3. The method of claim 1, wherein each of the plurality of routing paths is defined in terms of a plurality of intermediate nodes traversed by a respective data packet in reaching the base node.

4. The method of claim 3, wherein the measurements carried in the respective data packet are aggregated at each of the plurality of intermediate nodes.

5. The method of claim 1, wherein determining the plurality of routing paths is based on routing topology tomography along the plurality of routing paths.

6. The method of claim 1, wherein determining the representation basis further comprises:
   determining an underlying graph based on the plurality of routing paths;
   performing a hierarchy decomposition of the underlying graph;
   applying machine learning to the hierarchy decomposition of the underlying graph to construct the graph wavelets; and
   determining the representation basis based on the graph wavelets.

7. The method of claim 1, wherein the representation basis is a sparse matrix having an optimized incoherency with the measurement matrix.

8. A system for data acquisition in wireless sensor networks, the system comprising:
   a wireless sensor network comprising a plurality of sensor nodes and a base node; and
   a computing device coupled to the wireless sensor network, the computing device having a processor and a memory, the memory including instructions that, when executed by the processor, cause the processor to:
   receive measurements made by the plurality of sensor nodes during a given time period, the measurements being aggregated and carried in data packets routed from the plurality of sensor nodes to the base node;
   determine a plurality of routing paths for the data packets based on routing topology tomography, the plurality of routing paths representing paths traversed by the data packets in the wireless sensor network to reach the base node;
   determine a measurement matrix from the plurality of routing paths;
   determine a representation basis for sensor signals in the wireless sensor network using graph wavelets; and acquire the sensor signals in the wireless sensor network based on the measurement matrix and the representation basis.

9. The system of claim 8, wherein the instructions that cause the processor to determine the measurement matrix further cause the processor to:
calculate a routing matrix based on the plurality of routing paths; and
adopt the routing matrix as the measurement matrix.

10. The system of claim 8, wherein each of the plurality of routing paths is defined in terms of a plurality of intermediate nodes traversed by a respective data packet in reaching the base node.

11. The system of claim 10, wherein the measurements carried in the respective data packet are aggregated at each of the plurality of intermediate nodes.

12. The system of claim 8, wherein the instructions that cause the processor to determine the plurality of routing paths further cause the processor to determine the plurality of routing paths based on routing topology tomography along the plurality of routing paths.

13. The system of claim 8, wherein the instructions that cause the processor to determine the representation basis further cause the processor to:
determine an underlying graph based on the plurality of routing paths;
perform a hierarchy decomposition of the underlying graph;
apply machine learning to the hierarchy decomposition of the underlying graph to construct the graph wavelets; and
determine the representation basis based on the graph wavelets.

14. The system of claim 8, wherein the representation basis is a sparse matrix having an optimized incoherency with the measurement matrix.

15. A non-transitory computer readable storage medium having instructions for data acquisition in wireless sensor networks, the instructions, when executed by a processor, cause the processor to:
receive measurements made by a plurality of sensor nodes in a wireless sensor network during a given time period, the measurements being aggregated and carried in data packets routed from the plurality of sensor nodes to a base node in the wireless sensor network;
determine a plurality of routing paths for the data packets based on routing topology tomography, the plurality of routing paths representing paths traversed by the data packets in the wireless sensor network to reach the base node;
determine a measurement matrix from the plurality of routing paths;
determine a representation basis for sensor signals in the wireless sensor network using graph wavelets; and
acquire the sensor signals in the wireless sensor network based on the measurement matrix and the representation basis.

16. The non-transitory computer readable medium of claim 15, wherein the instructions that cause the processor to determine the measurement matrix further include instructions that cause the processor to:
calculate a routing matrix based on the plurality of routing paths; and
adopt the routing matrix as the measurement matrix.

17. The non-transitory computer readable medium of claim 15, wherein each of the plurality of routing paths is defined in terms of a plurality of intermediate nodes traversed by a respective data packet in reaching the base node.

18. The non-transitory computer readable medium of claim 17, wherein the measurements carried in the respective data packet are aggregated at each of the plurality of intermediate nodes.

19. The non-transitory computer readable medium of claim 15, wherein the instructions that cause the processor to determine the plurality of routing paths further include instructions that cause the processor to determine the plurality of routing paths based on routing topology tomography along the plurality of routing paths.

20. The non-transitory computer readable medium of claim 15, wherein the instructions that cause the processor to determine the representation basis further include instructions that cause the processor to:
determine an underlying graph based on the plurality of routing paths;
perform a hierarchy decomposition of the underlying graph;
apply machine learning to the hierarchy decomposition of the underlying graph to construct the graph wavelets; and
determine the representation basis based on the graph wavelets, wherein the representation basis is a sparse matrix having an optimized incoherency with the measurement matrix.

* * * * *